Figure 9:
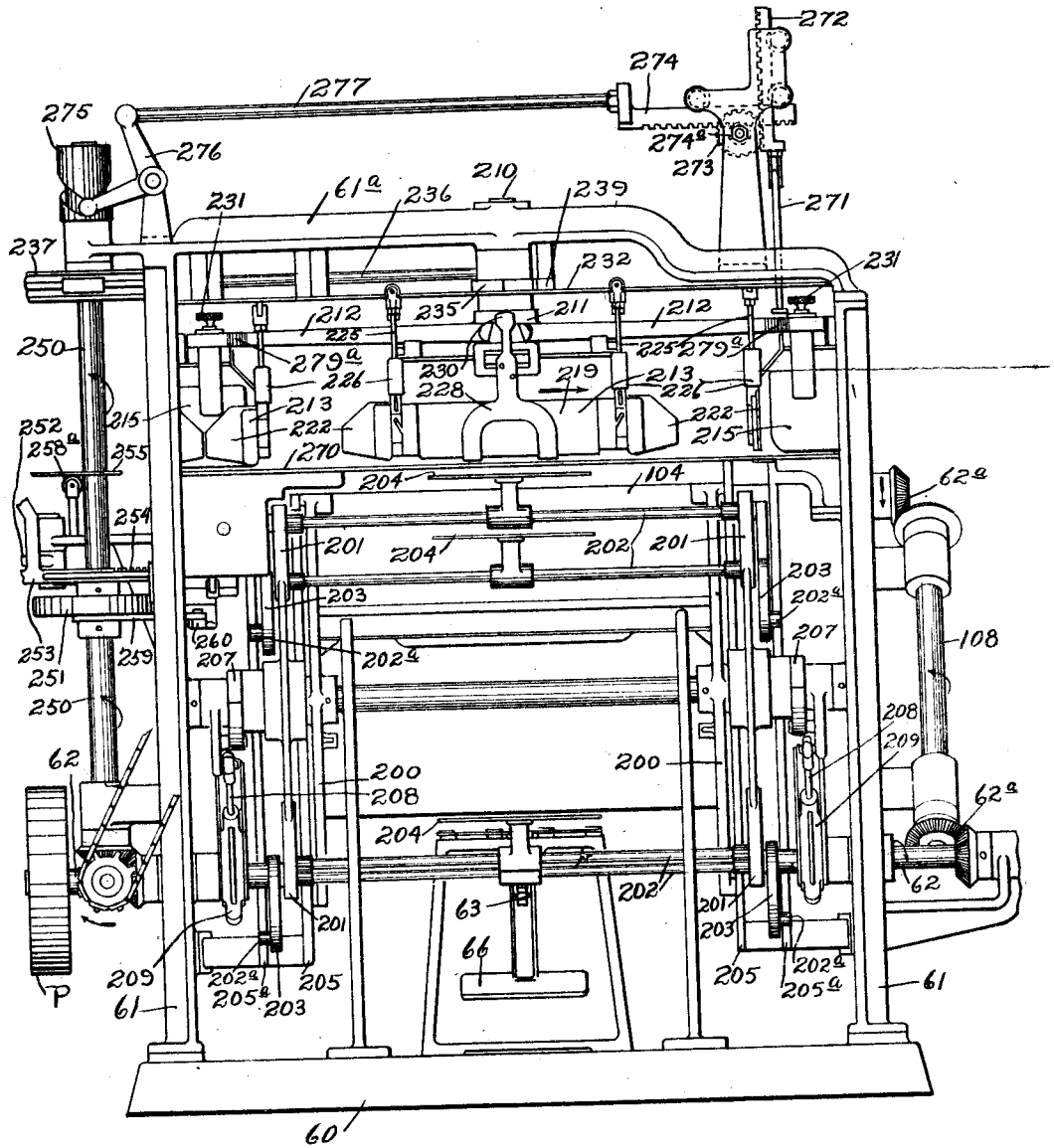

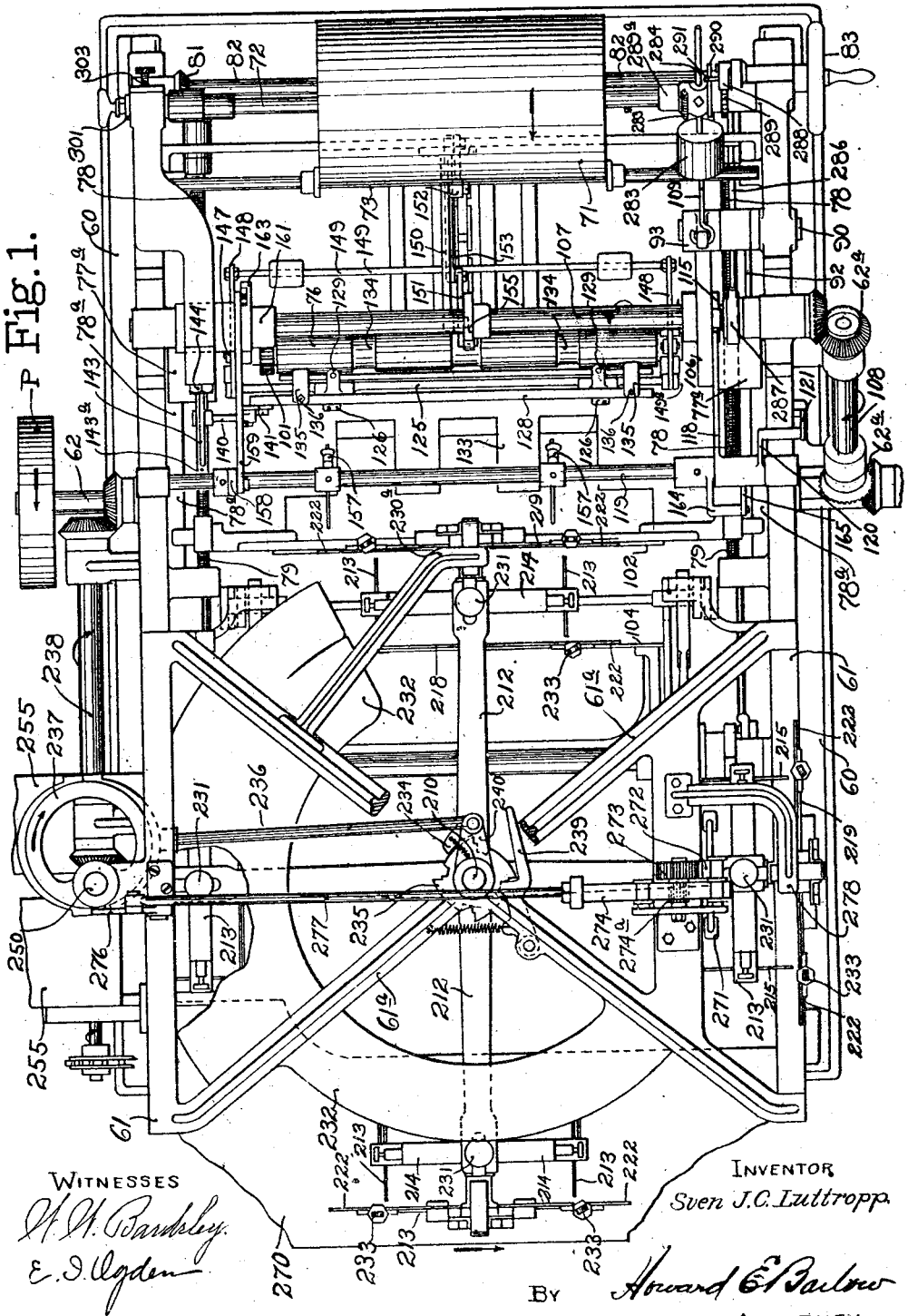

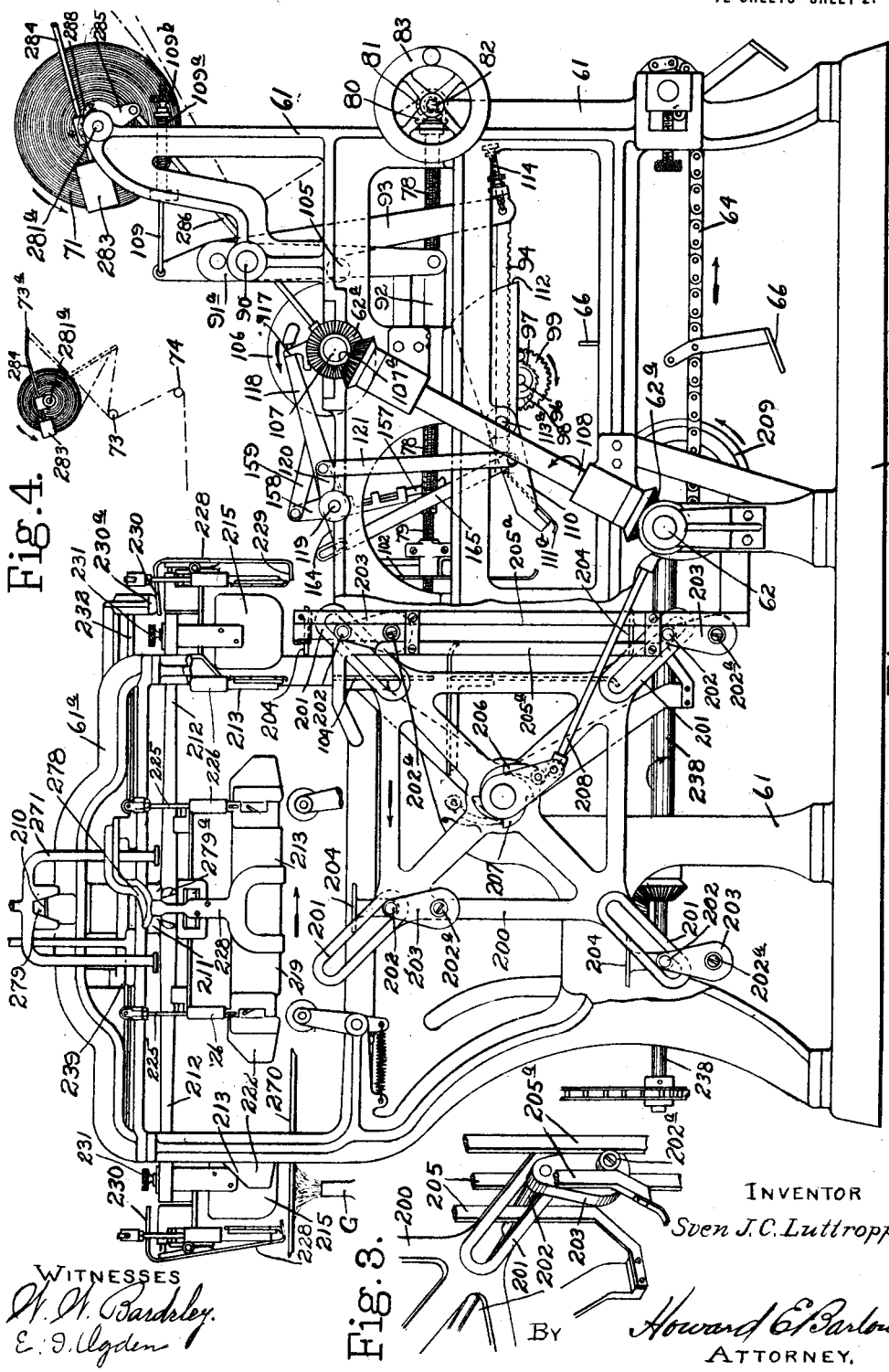

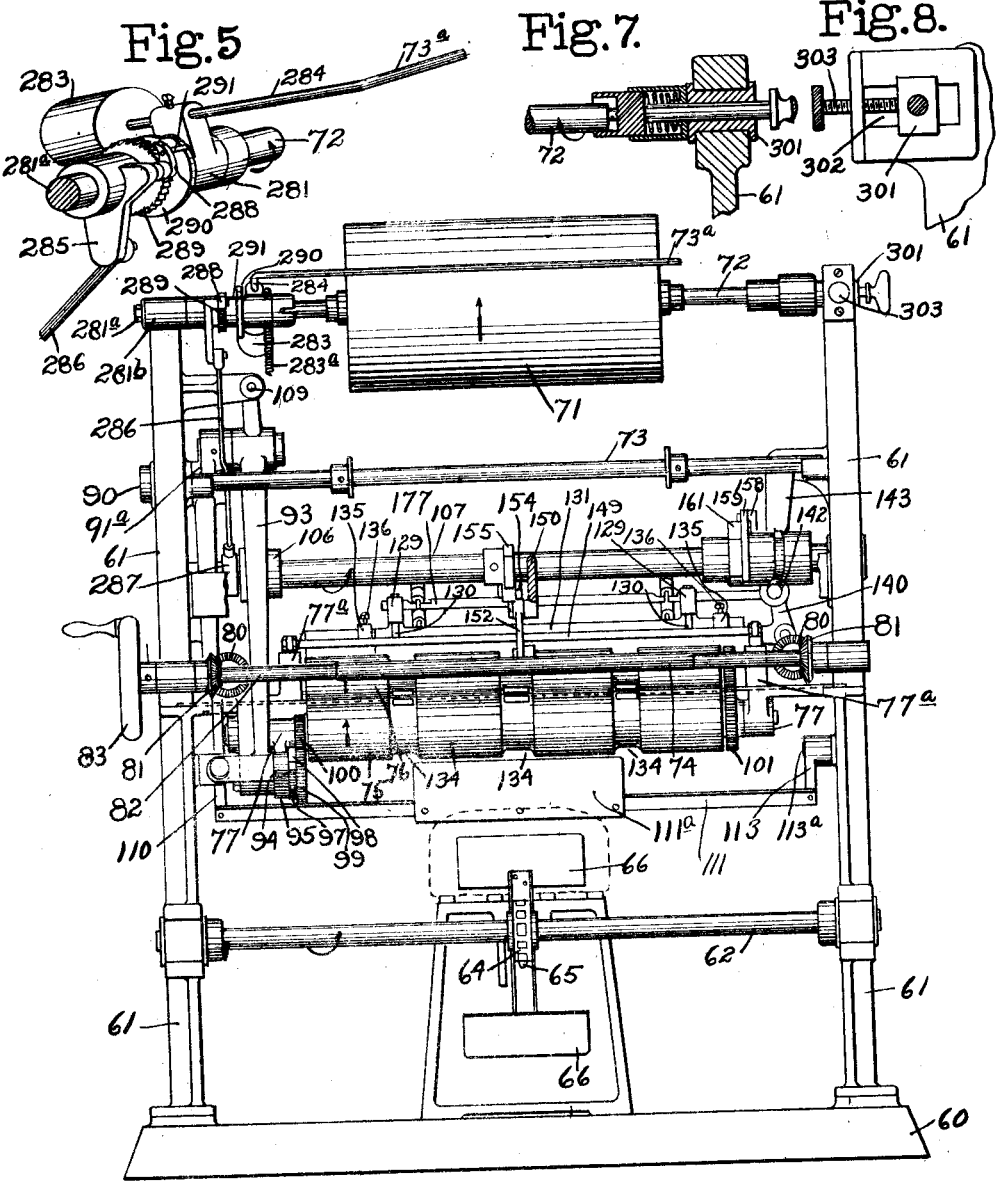
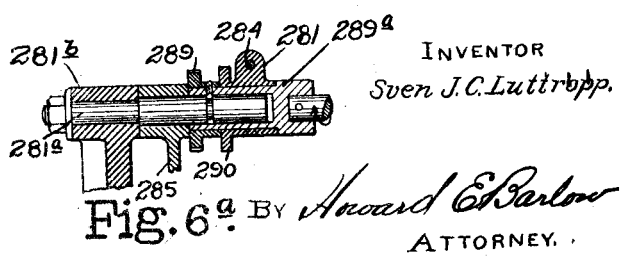

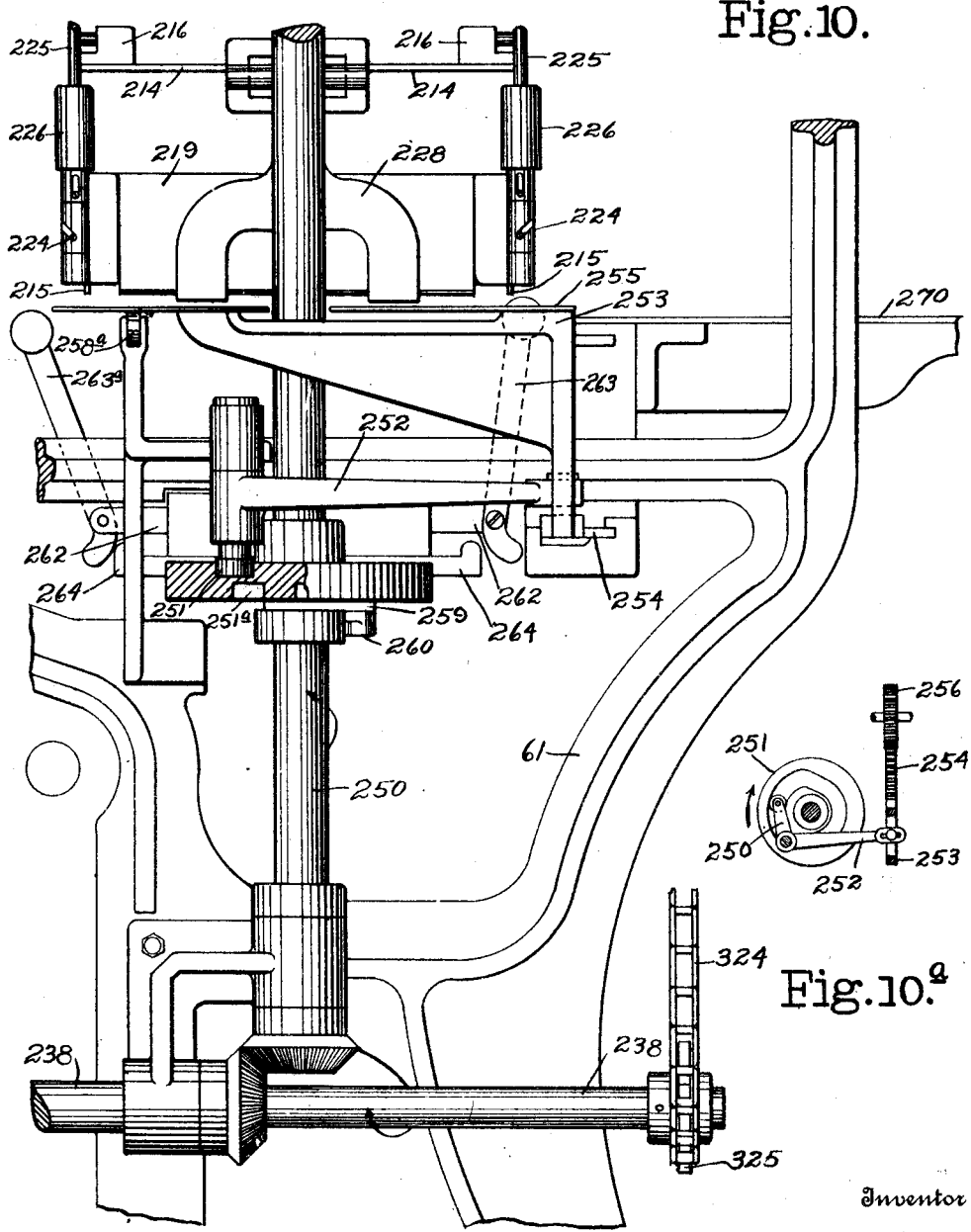

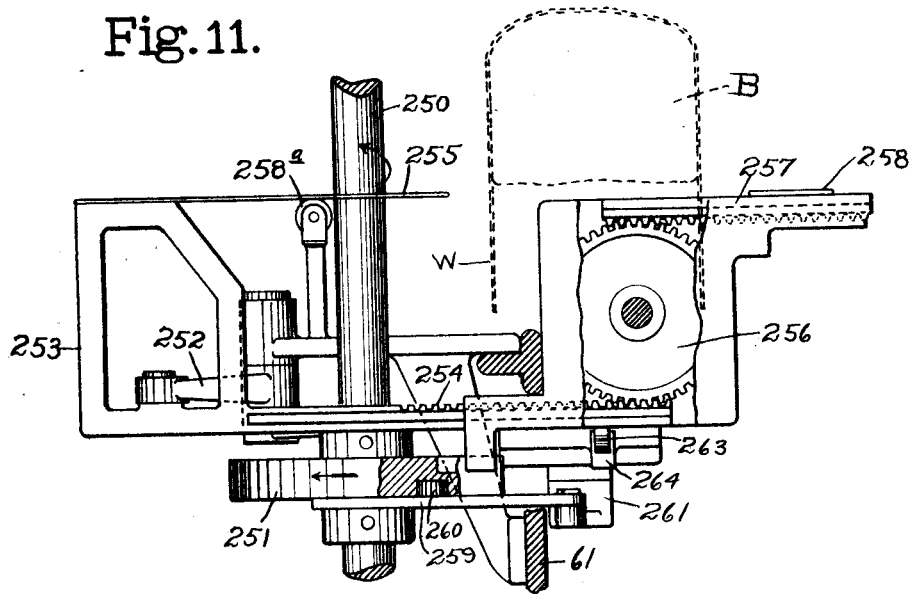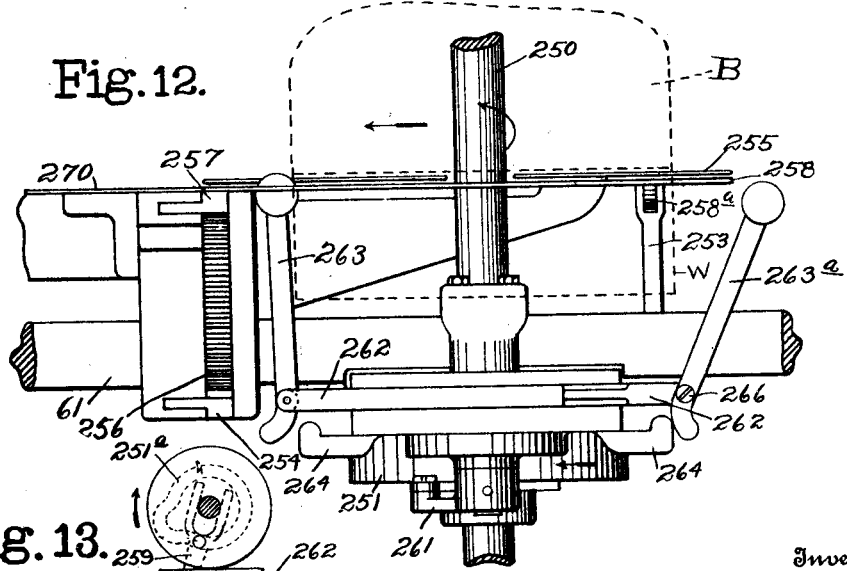

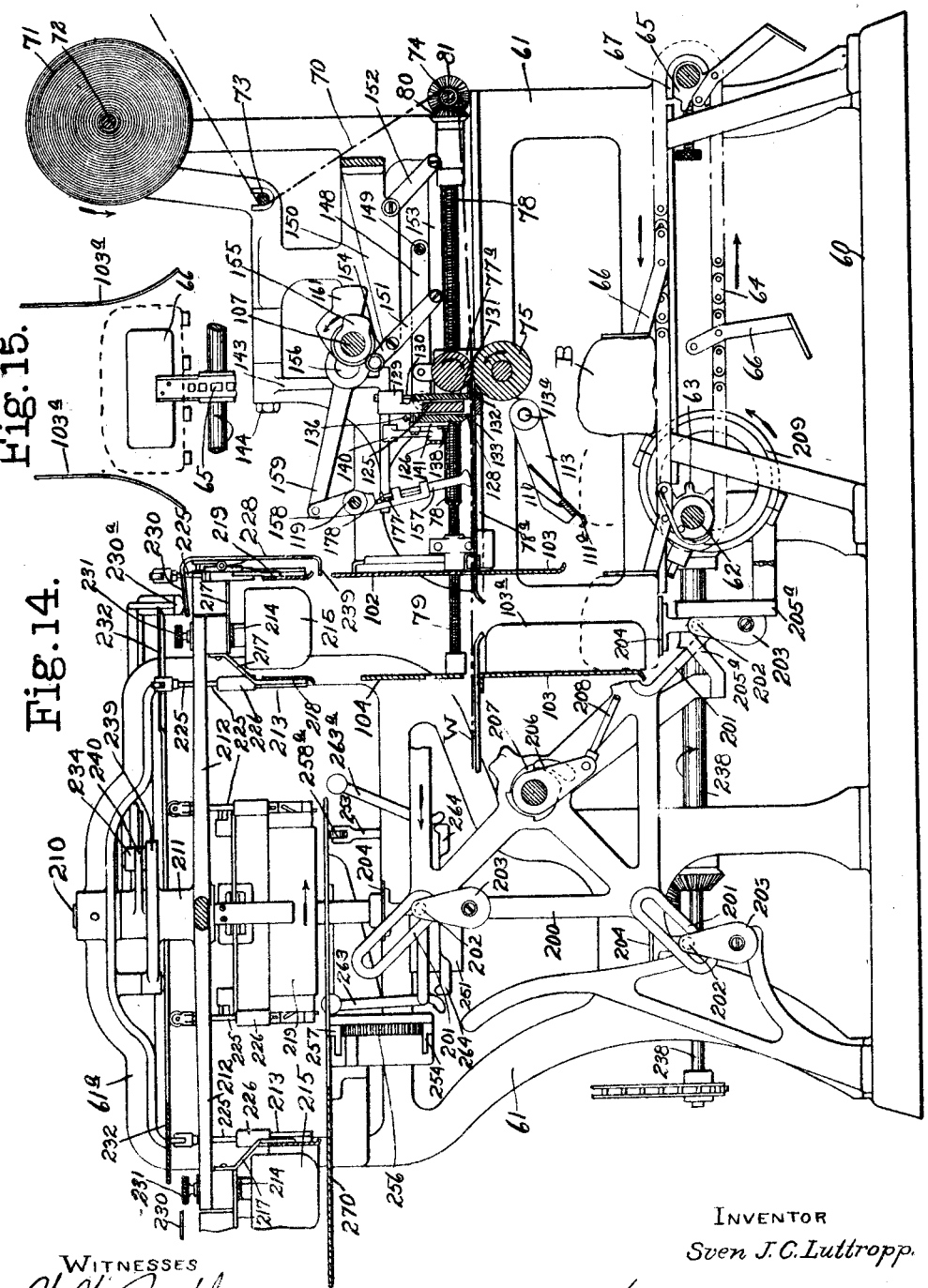

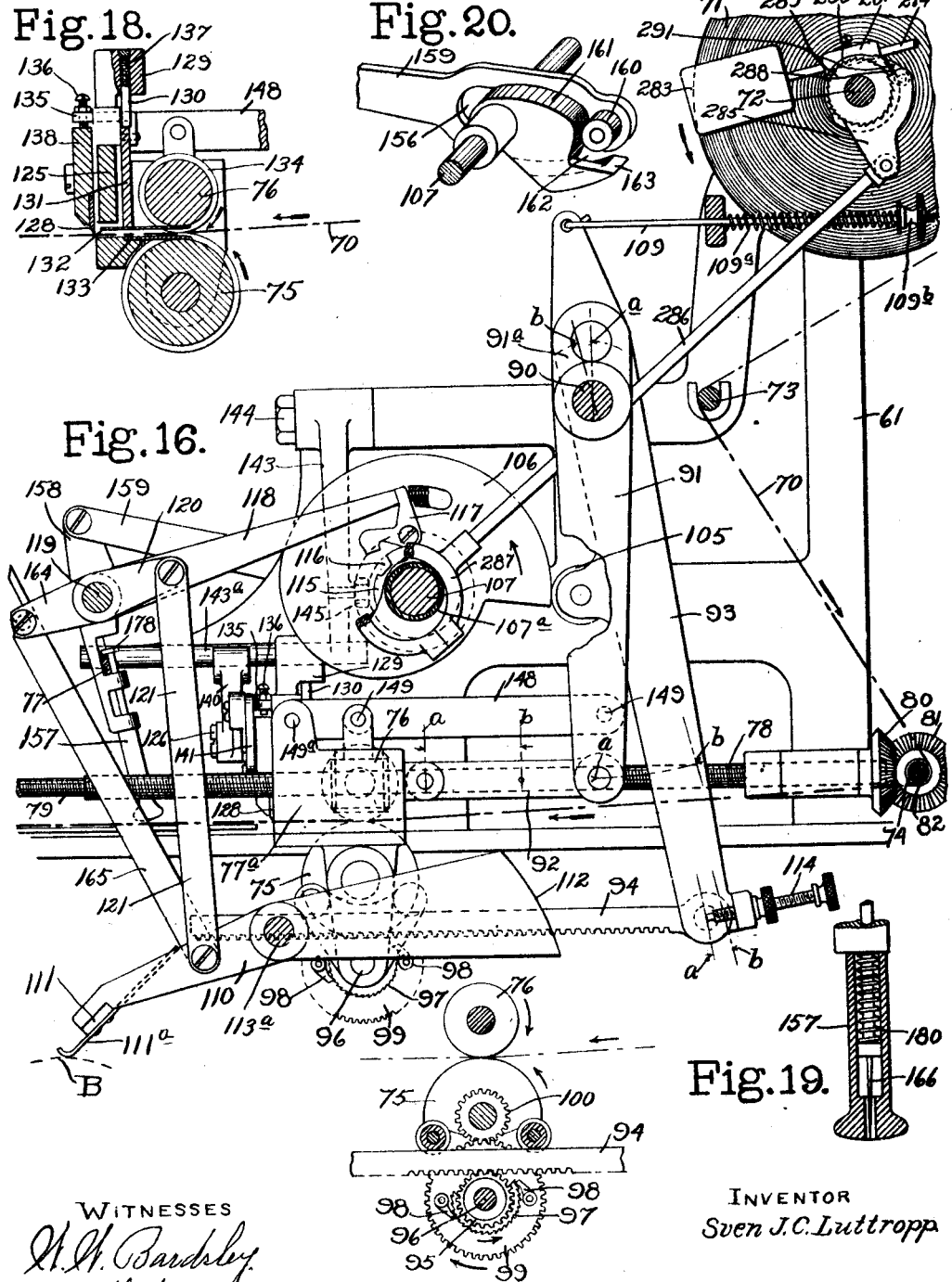

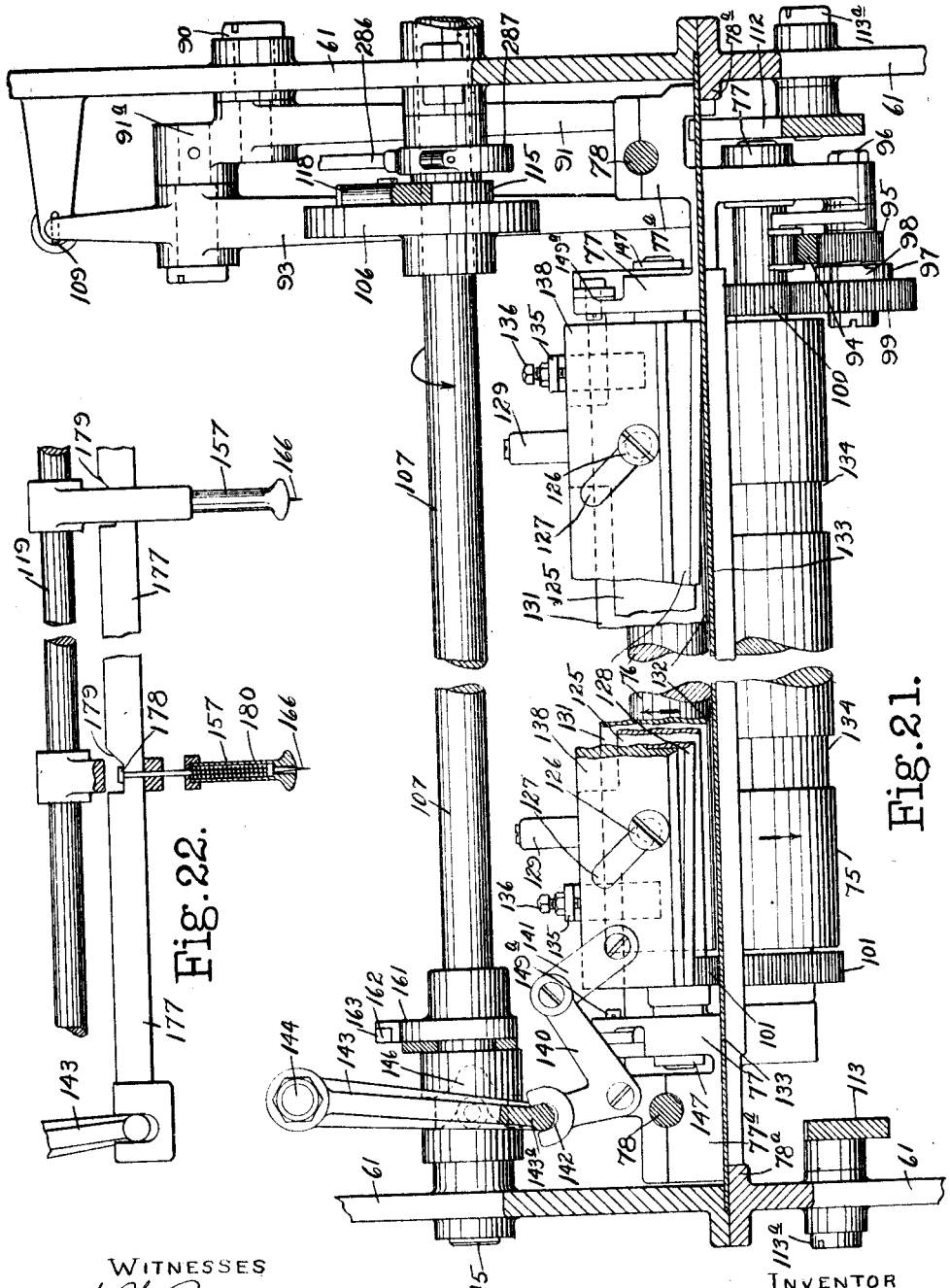

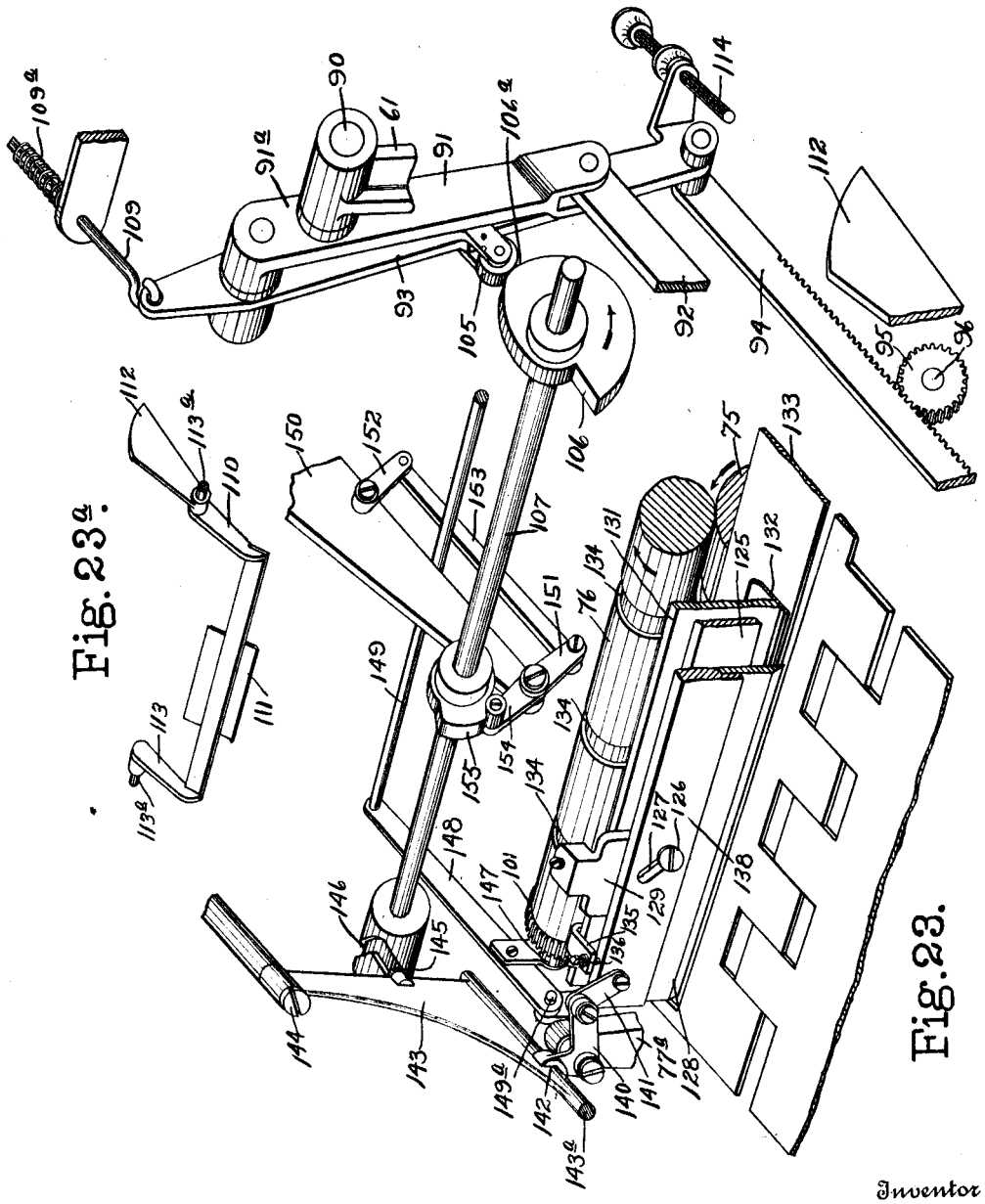

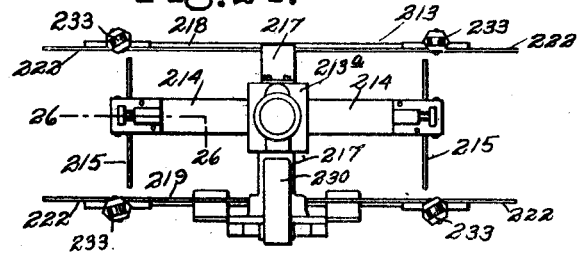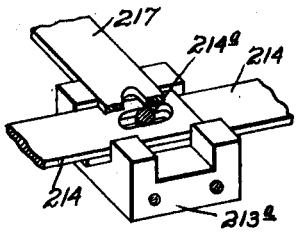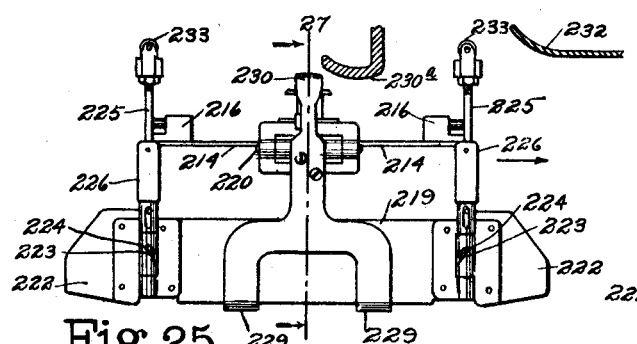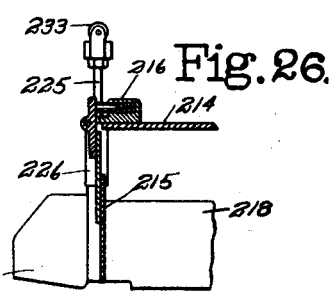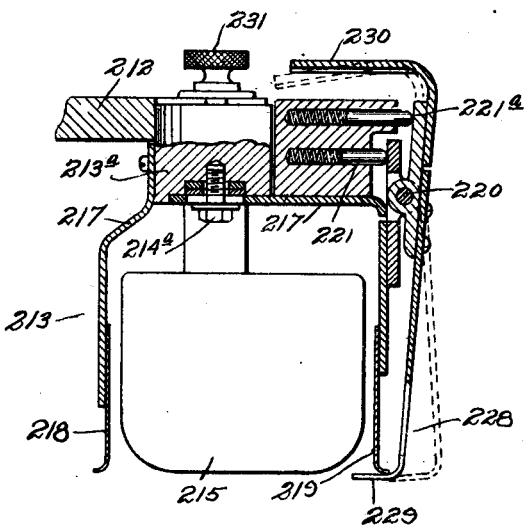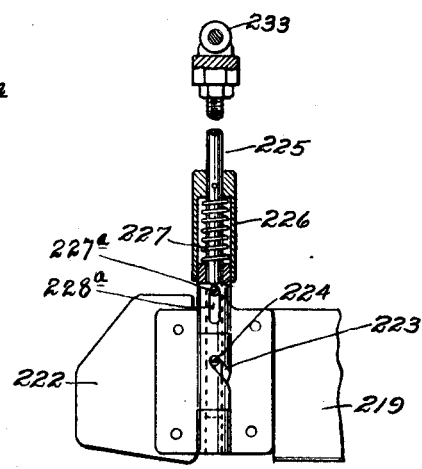

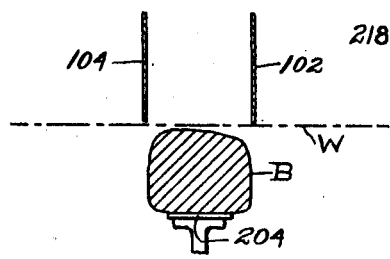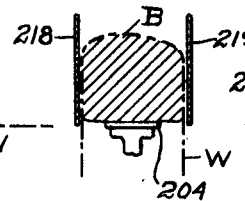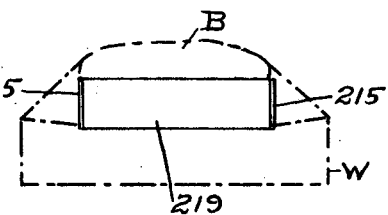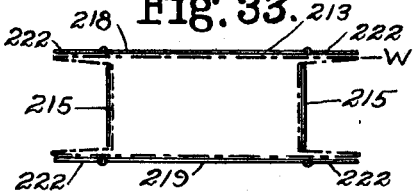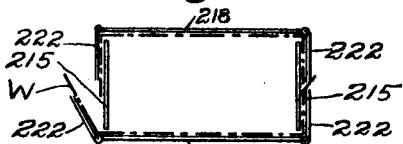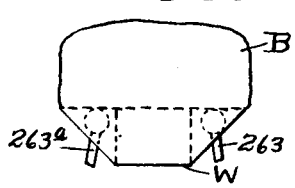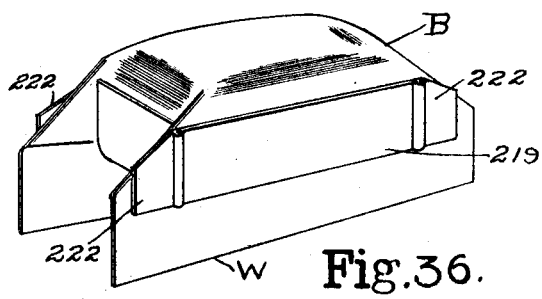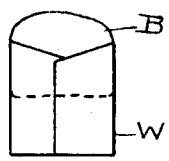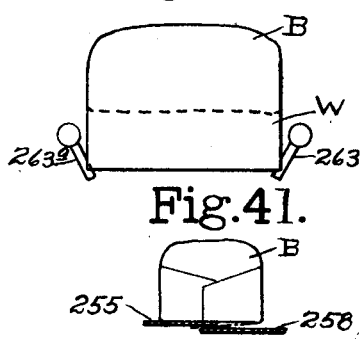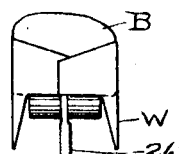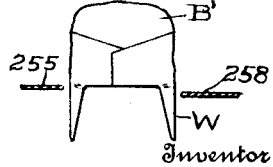

UNITED STATES PATENT OFFICE.

SVEN J. C. LUTTROPP, OF ATTLEBORO, MASSACHUSETTS, ASSIGNOR TO E. THEODORE I. THYGESON, OF NEW YORK, N. Y.

WRAPPING-MACHINE.

1,182,393.  Specification of Letters Patent.  Patented May 9, 1916.

Application filed September 13, 1912. Serial No. 720,297.

*To all whom it may concern:*

Be it known that I, SVEN J. C. LUTTROPP, a subject of the King of Sweden, and resident to Attleboro, in the county of Bristol and State of Massachusetts, United States of America, have invented certain new and useful Improvements in Wrapping-Machines, of which the following is a specification.

This invention relates to improvements on wrapping machines, and has reference more particularly to machines adapted to wrap bodies of regular or irregular form, such as loaves of bread.

One of the objects of the invention is to provide means for automatically measuring off the exact amount of wrapping material required at each wrapping.

A further object is to provide means for varying the size of the wrapper to conform with variations in the sizes of the articles to be wrapped.

A further object is to provide means for centralizing the wrapper and to accurately place the same in position to engage the article to be wrapped irrespective of the size of the wrapper.

A further object is to provide means for adjusting the wrapper feed mechanism so as to vary the amount of lap of the wrapper in the wrapping operation.

A further object is to provide means for feeding the wrapping material in the form of a continuous web maintaining a uniform tension thereon, and for severing the wrappers after said material has been fed forward the desired amount to provide the predetermined size.

A further object is to provide means for governing the supply of wrapping material which consists in suitable mechanism actuated by the machine to unwind the roll of paper an amount equal to that used in the last wrapping thereby permitting the tension arm to return to normal.

A further object is to provide means for rendering the feed mechanism inoperative after the predetermined quantity of the wrapping material has been fed to form a wrapper.

A further object is to provide means for feeding the articles to be wrapped and to bring said articles successively into engagement with the wrappers.

A further object is to provide a rotatable head or turret having means for supporting the articles to be wrapped during the wrapping operations.

A further object is to provide carriers supported by said head or turret, the same being adapted to receive the article and its wrapper and fold the end flaps of the wrapper around the article to be wrapped.

A further object is to provide means coöperating with said carrier for folding the bottom flaps of the wrapper around the article to be wrapped.

A further object is to provide means for finally expelling the loaf from the carrier after the wrapper has been sealed.

A further object is to provide improved means for successively arresting the carriers in exact juxtaposition with the wrapper after the latter has been severed and positioned.

A further object of the invention is to provide simple and effective means whereby the machine may be readily adjusted to handle a series of articles differing in general dimensions from the dimensions of a series of articles previously fed to the machine.

In other words, the invention contemplates a machine adapted to automatically measure off the exact amount of paper or wrapping material required at each wrapping, which amount varies with the size of each different loaf or articles to be wrapped; to sever the paper thus measured from the strip; to then centralize the sheet or move it to the exact center and above the path of travel of the loaf to be wrapped; to feed in loaves of bread at predetermined intervals; and then elevate each loaf as presented to, engage the underside of the sheet and cause the sides of the sheet to be bent down around the sides of the loaf as the latter continues its upward travel into a rotatable carrier, by which carrier the loaf is securely retained and moved by successive steps to different positions to be operated upon to complete the folds of the paper around it and expel the completed package.

The invention further consists in the provision of simple and effective means whereby the machine may be readily adjusted to handle different matches of bread whose loaves vary considerable in size. In other words, after handling a batch having loaves of a ten-cent size the machine may be readily adjusted to receive and wrap loaves of the five-cent size which adjustment is accomplished by the simple rotation of a single hand wheel and exchange of carriers.

An essential feature of the invention is the mechanism for accurately measuring the exact size of sheet required to properly cover the loaf and to centralize the sheet relative to the path of travel of the loaf, thereby reducing the size of sheet required to wrap the loaf to the minimum and effectively avoid waste of paper.

With these and other objects in view, the invention consists of certain novel features of construction, as will be more fully described and particularly pointed out in the appended claims.

Of the accompanying drawings: Figure 1 is a plan view of my improved wrapping machine. Fig. 2 is a side elevation of the machine with a portion of the side frame removed to better show the operating mechanism. Fig. 3 is a detail showing the elevator supports entering their guide ways. Fig. 4 is a detail illustrating the action of the paper governor feed controlling arm for producing the proper tension on the web when feeding. Fig. 5 is a detail in perspective showing the governing mechanism for controlling the action of the roll of wrapping paper. Fig. 6 is a view from the rear end of the machine showing some of the parts broken away to better illustrate the operating mechanism. Fig. 6ª is a detail showing the paper roll governor mechanism in section mounted on its supporting short shaft. Fig. 7 is an enlarged sectional view of the mechanism for holding one end of the paper roll shaft. Fig. 8 is an enlarged side elevation showing means whereby a lateral adjustment of one end of the paper roll shaft may be obtained for alining the surface of the paper roll with the axis of the feed rolls. Fig. 9 is a front elevation of the machine with the sealing mechanism removed. Fig. 10 is an enlarged side elevation from the left side of the machine showing the mechanism for performing the two last folds of the paper across the bottom of the loaf. Fig. 10ª is a reduced scale detail plan view, partly in section, showing a portion of the cam and connected mechanism for operating the bottom side flap folders. Fig. 11 is an elevation partly in section of the same mechanism as that shown in Fig. 10 looking from the front of the machine. Fig. 12 is an elevation showing the same mechanism as Figs. 10 and 11, but looking from the inside of the machine outward. Fig. 13 is a detail plan view on reduced scale illustrating the cam and connected mechanism for completing the bottom end folds. Fig. 14 is a side elevation of the whole machine, partly in section, to more particularly illustrate the loaf feed and paper feeding mechanism. Fig. 15 is a detail showing an end view of the carrier and end guide plates for the centering loaf. Fig. 16 is an enlarged view, partly in section, showing the paper feed control, the mechanism for automatically feeding the length of sheet proportionate to the varying heights of the different loaves and severing the same, and means for positioning and centralizing the sheet after having been severed, also means for adjusting the feeding mechanism for wrapping loaves of different widths. Fig. 17 shows the rack and ratchet mechanism through which the feed rolls are operated. Fig. 18 is a sectional view of the feed rolls and paper severing knife. Fig. 19 is an enlarged sectional view of one of the paper adjusting needle fingers. Fig. 20 is a perspective view showing the needle finger operating arm and the cam for completing the adjusting movement of said arm, also the internal cam for returning the parts to normal. Fig. 21 is an enlarged front view, partly in section, showing the paper feeding and cutting mechanism. Fig. 22 is a view of the paper centralizing needle fingers and the mechanism for controlling the position of the needles in said fingers. Fig. 23 is a perspective view of the strip measuring, feeding, clamping and severing mechanism. Fig. 23ª is a perspective view on reduced scale, illustrating the feeler bar and plate as supported on pivoted arms, and the gage cam connected thereto all comprising a single unit. Fig. 24 is a plan view of the loaf carrier. Fig. 25 is a side elevation of the carrier from its expandible side, also showing a portion of the cam for operating the loaf retaining fingers and a portion of the cam for operating the end folders. Fig. 26 is a section on line 26—26 of Fig. 24 showing one of the expandible end plates and the spring pin for applying tension thereto. Fig. 27 is a slightly enlarged elevation of the carrier in cross section on line 27—27 of Fig. 25 showing the stationary side, the spring pin for applying tension to the expandible side, and the spring pin for positioning the loaf retaining fingers, also the common hinge on which both this side and finger are mounted. Fig. 28 is a side elevation of the end folder plate showing the actuating cam hinge arranged to be operated by a vertical movement of the hinge rod. Fig. 29 is a perspective view illustrating the arrangement of parts in the carrier head whereby one side plate and both end plates may be adjusted to receive loaves of different sizes. Fig. 30 is a diagrammatic view illustrating a loaf in section supported on its elevator about to enter the guide plates on its way up to the carrier, the wrapping paper being shown in dot-dash lines and the sides of the carrier in section. Fig. 31 shows the loaf as having entered the guide plates the sides of which serve to fold the paper downward over the top and sides of the loaf. Fig. 32 is a side elevation showing the paper folded on the ends of the loaf by the carrier end plates as the loaf is raised thereinto. Fig. 33 is a diagrammatic plan view of the carrier showing the arrangement of the paper in dot-dash lines as it appears directly after entering the same. Fig. 34 is a perspective view showing the arrangement of the parts as illustrated in Fig. 4 before the ends of the paper have been folded in. Fig. 35 is a diagrammatic view of the carrier showing the mechanism of the carrier as having folded the paper from both sides across one end of the loaf and from one side across the opposite end of the loaf. Fig. 36 is an end view of the package containing the loaf after the paper has been folded across its end. Fig. 37 is a side elevation of the package showing the rolls in position to make the first bottom fold of the paper. Fig. 38 illustrates these rolls as having made the first bottom fold. Fig. 39 is an end elevation of these rolls after having made the fold. Fig. 40 shows the package in position to be acted upon by the side bottom folding plates. Fig. 41 shows the package as having been acted upon by these side folders.

Referring to the drawings, 60 designates the base supporting the frame 61 in which the operating parts are mounted. The main shaft 62 is mounted in suitable bearings and receives power from any preferred source which may be applied through the pulley P. Mounted on said shaft is a sprocket wheel 63 which drives a sprocket chain or conveyer belt 64 passed around a second sprocket wheel 65, suitably mounted at the feed end of the machine. Pivotally connected to the sprocket chain 64 are conveyer members 66 which on their return engage a trip device 67 arranged to move said members 66 to the position shown in Fig. 14, so as to engage a loaf of bread B, or other similar article, which is presented to the conveyer in any suitable or preferred manner. I have not attempted to illustrate the means by which the articles to be wrapped are thus presented as they may be fed by hand or automatically, as desired.

The wrapping material 70 is preferably in the form of a continuous web of paper, or other suitable material, the same being placed in the machine in the form of a roll carried by a shaft 72 whose mounting and actuating means is hereinafter more fully described. Said wrapping material is led from its roll 71 over tension rolls 73—73ª and 74 which serve to remove the curl that the paper acquires from standing in a roll form. From the last tension roll 74 the paper is led forward between feeding rolls 75—76, the ends of which are mounted in bearing members 77 located at opposite sides of a carriage member 77ª, each being in the form of a nut provided with a threaded portion engaging the corresponding threads of an adjusting shaft 78, said carriage being supported on suitable guides 78ª. The threaded shafts 78 are provided with reduced threaded extensions 79 the pitch of the threads of the latter portion being one-half of the pitch of the threads on the former portion. Each shaft 78 is provided at its outer end with a bevel pinion 80 meshing with a similar pinion 81 on an operating shaft 82 provided with a hand wheel 83, whereby said threaded shafts and their extensions may be simultaneously rotated. Pivotally mounted at 90 in the frame 61 is a lever 91 one end of which is connected by a link 92 with one of the bearing or carriage members 77. The extension 91ª is rigidly connected with lever 91 to which extension is pivoted the gage arm 93, the free end of the latter being connected with a gage rack 94 meshing with pinion 95 on the shaft 96 supported by carriage 77ª, said pinion being provided with a ratchet 97 coöperating with pawls 98 carried by the gear 99. Said gear 99 meshes with a pinion 100 secured to the shaft of the lower feed roll 75, whereby said roll is rotated. It will be observed that this construction is such that movement of the rack 94 in one direction will rotate the pinion 95 but will not affect the gear 99. Return movement of the rack 94 however, by reason of the pawl and ratchet connection between the pinions 95 and the gear 99, will cause the feed rolls 75 to rotate to feed the paper. The rolls 75 and 76 are provided with suitable intermeshing gears 101, whereby rotation of the roll 75 effects a positive corresponding rotation of the roll 76. Adjustably connected with the shaft extensions 79 is an upright plate 102 which coöperates with the stationary folder plate 104, in a manner to be later described. The lever 93 is provided with a roller 105 which bears against a cam 106 secured to the shaft 107, which is driven by an inclined shaft 108 from the main drive shaft 62 by suitable bevel gearing 62ª best illustrated in Fig. 2. The roller 105 is held in engagement with cam 106 by means of a spring 109ª acting on lever 93 through a rod 109 connected thereto. The tension of said spring may be regulated by the nut 109ᵇ.

An essential feature of the invention is the provision of a feeler bar 111 which is preferably widened out or provided with a central feeler plate 111ª. This bar is arranged to extend completely across the path of travel of the incoming loaves and its ends are connected to and supported by the forwardly extending arms 110 and 113, the opposite ends of said arms being loosely mounted on the pivot pins 113ª. Said feeler plate is so supported as to intercept the path of movement of the articles B as they are fed in by the conveyer members 66. To the pivoted end of the arm 110 is also connected an arm having a cam surface 112 so that this complete device forms a unit constituting a combined measuring and tripping member best illustrated in Fig. 23ª, the cam 112 in this structure being arranged to form an adjustable stop for the gage lever 93, the latter being provided with an adjustable abutment screw 114. The curve of this cam is laid out in definite relation and in proportion to the gearing of the feed rolls 75, 76, so that a given position of the cam determines the length of sheet to be fed. For instance, a change of one-eighth inch in the length of the forward stroke of the gage lever will cause a relative difference of approximately one-half an inch in the length of the sheet, or in other words, a small difference in the stroke of the gage lever, due to the position of the cam, means considerable difference in the length of sheet fed, and the curve of this cam is therefore so arranged as to compensate for variations in the height of articles B by controlling the stroke of the gage lever. The shaft 107 is provided with a loose sleeve 107ª driven continuously by the bevel gears 62ª and carries a clutch 115 having a notch 116 which may be engaged by a spring pressed locking pawl 117 carried by cam 106. Said pawl is disengaged from the notch 116 by the entering loaf which raises the latch arm 118 pivotally mounted on a rock shaft 119, through the crank arm 120, link 121 and arm 110 so that when the pawl is released it falls and locks the rotating sleeve 107ª to the shaft 107 through the collar and cam above mentioned to operate the paper feeding mechanism hereinafter described.

The paper severing mechanism comprises bar 125 supported by carriage 77ª and provided with screws 126 or similar devices passed through inclined slots 127 in the knife bar 138, whereby longitudinal reciprocation of said knife will cause the same to move up or down, according to the direction of reciprocation to sever the paper with a draw-cut action. Said supporting bar 125 is provided with lugs 129 each having a bore to receive a presser pin 130, said pins resting on a clamp member 131 which is provided with a presser foot 132 coöperating with a stationary bed plate 133. The paper 70 is passed between the presser foot 132 and the plate 133, the feed rolls 75 and 76 being provided with annular groovs 134 to accommodate said presser foot 132 and extending portions of the bed plate 133. Secured to the clamp bar 131 are overhanging arms 135 provided with adjusting screws 136 which rest upon the top of the cutter bar 138. Coil springs 137 act upon the pins 130 tending to normally depress the clamp bar 131 and the presser foot 132 to rigidly clamp and hold the web while it is being severed by the cutter. The cutter bar is reciprocated by means of the bell-crank lever 140 having one arm connected to the cutter bar by means of a link 141, the other arm of said bell-crank lever being provided with a socket or seat 142 to receive a lever 143 pivotally supported at 144. This lever 143 is provided with an elongated or longitudinally extending foot 143ª best illustrated in Fig. 23, so as to permit the levers that are actuated by its movement to slide back and forth thereon as their position varies with the adjustment of the carriage. Said lever is provided with a rearwardly extending pin 145 which enters a cam groove 146 in a cam carried by the shaft 107. Oscillation of lever 143 affects a corresponding reciprocation of the cutter bar. The upper feed roller 76 is journaled in suitable bearings 147 carried near the inner ends by a pair of arms 148, the outer ends of which arms are connected by a cross rod 149, said arms being pivoted at 149ª in the carriage 77ª. Located at a point between the two arms 148 is a rigid supporting bracket 150 to which is pivoted two links 151 and 152 connected at their lower ends by a bar 153. Link 151 is provided with a projection 154 having a roller engaging a cam 155 carried by the shaft 107. The arrangement is such that a forward movement of the link 151 by the cam 155, causes the cross bar 153 to engage the rod 149 and thereby raise the arms 148 and consequently separate the feed rolls.

In order to center the wrapper W with respect to the plates 102 and 104 which determine the path of travel of the article to be wrapped, the rock shaft 119 is provided with adjusting fingers 157 which are provided with means for engaging the wrapper. The rock shaft 119 is provided with a crank arm 158 to which is connected a cam actuated arm 159 one end of which is slotted at 156 to straddle shaft 107 by which it is supported and guided. Said link is provided with a roller 160 coöperating with a cam 161 secured to the shaft 107. Said cam is provided with a slot 162 to receive roller 160, and also with an exterior cam surface 163 coöperating with said roller 160. Said rock shaft 119 is also provided with a crank arm 164 which is engaged by a slotted link 165 connected to the member 110.

The adjusting fingers 157 are hollow and each is provided with a longitudinal bore in which is mounted a needle 166. Each needle has a head 178 extending through a cam bar 177 whereby the points of said needles are caused to be completely housed within or are permitted to project from said fingers by the action of the cam surfaces 179 formed on said bar. The cam bar is reciprocated by suitable forked or slotted connection with the long footed lever 143, and a spring 180 located in the bore of each finger serves to depress the needle when the head 178 engages the lower surface of cam 179.

The operation of the parts thus far described is as follows: The loaves of bread or other articles to be wrapped, designated by the character B, are fed to the conveyer 64 in any suitable manner, and as they pass beneath the feeler plate or bar 111, the latter is raised, thereby raising the forward end of member 110. As this member is thus raised by the article B, the link 121 raises the latch releasing finger 118, thereby permitting the pawl 117 carried by cam 106 to be forced into engagement with a shoulder of the collar 115 of the clutch on the continuously rotating sleeve 107ª whereby the motion of said shaft is communicated to said cam and its shaft 107. As the cam is now rotated in the direction of the arrow the gage lever 93 is moved forward by reason of the roller 105 moving off of the cam 106 under the action of spring 109ª (see Fig. 16). It will be noted that the curve of cam surface 112 is eccentric to the pivot of arm 110 and that as the gage member 93 moves forward the abutment screw 114 will contact with the said cam surface 112, thereby arresting further movement of said gage lever. As the gage lever 93 moves forward the rack 94 is correspondingly moved, effecting a rotation of the pinion 95. As the cam 106 continues its rotation the gage lever 93 is returned to its primary position carrying the rack 94 back with it and effecting a relative rotation of the feed rollers 75 and 76. In this manner it will be seen that the quantity of paper fed forward by the feed rolls is gaged by the point at which the abutment 114 engages the stroke controlling cam 112, and this position is determined by the height of the article passing under the feeler plate or bar 111. Thus the exact amount of paper necessary to wrap the article is accurately and automatically determined. Just as the return movement of the gage lever 93 is completed by the movement of cam 106 to its high point 106ª, see Fig. 23, the cam 146 moves the lever 143 to the right which in turn lowers the knife bar 128 and the clamp bar 131, the springs 137 forcing the latter down so that the presser foot 132 engages the paper just as the knife is about to shear the same, the same lever 143 also at the same time causes the needles 166 to pierce the paper and also hold it on the front side of the knife, thereby permitting a clean cut to be made without moving, tearing, or otherwise injuring the paper. At the same time, in order to prevent the momentum of the feed roll from carrying the paper farther forward and causing the latter to wrinkle or buckle against the presser foot 132, the cam 155 engages the projection 154 of the link 151, elevating the bar 153 into engagement with the rod 149, thereby actuating arms 148 to raise the upper feed roll 76 out of contact with the paper. Simultaneously with the raising of the feeler bar 111 the rock shaft 119 is oscillated by link 165, which effects a proportional movement of the adjusting fingers 157 and of cam actuated arm 159 by reason of the slot 156 therein. Thus the position of fingers 157 is determined by the height of the article B. The needles in these fingers are as above described caused by the arm 143 and cam bar 177 to pierce the sheet just before it is severed and immediately after it has been severed the cam 161 picks up the cam roll 160 from the position to which it has been moved, as just described, and moves said arm 159 to effect a further rotation of said rock shaft 119, the link 165 being slotted to permit the necessary independent movement of the crank arm 164. Thus the extent of the second movement of the adjusting fingers 157 is the difference between the first movement, due to the height of the article and the high point of cam 161. As the shaft 107 and cam 146 is rotated the cam bar 177 is reciprocated through the lever 143 to cause the needles 166 to protrude through the wrapper W, and the second oscillation of fingers 157 as above described, moves the wrapper forward to position the same centrally over the space between plates 102 and 104 which is the path of travel of the articles to be wrapped.

After the positioning movement is completed the arm 159 is returned to its normal position by the internal cam portion 162 thereby returning the positioning fingers 157, the bar 177 having first been reciprocated by a further rotation of said cam 146 to withdraw the needles 166. Thus it will be seen that the positioning fingers are first automatically adjusted so that their final positioning movement is proportionate to the size of the wrapper that has been severed and said wrapper is automatically sized by the article which it is to receive. In other words, the positioning fingers are first set by mechanism which is controlled by the size of the article to be wrapped and subsequently actuated to centralize the wrapper with relation to the path of movement of said article. The feeler unit, including the feeler bar 111 and cam 112, is exactly balanced so as to remain in any position to which it may be moved. Therefore when actuated by the article B it remains immovable until returned to neutral position by cam 163 through arm 159.

From the foregoing it will be observed that the amount of paper severed from the web 70 and forming the wrapper W depends entirely upon the size of the article B and that means are provided for accurately placing the wrapper, the placing means also having a movement governed solely by the size of the article B. Therefore only the amount of paper necessary to wrap the article is employed and waste of the wrapping material is obviated.

By feeding loaves of bread into the machine in a sidewise position as shown, and providing the bar 111 to extend across the machine, insures that the highest part of the loaf will always engage said bar 111 and correspondingly operate cam 112 so as to insure the feed of the proper amount of wrapping material required for each individual loaf.

Should it be desired to adjust the paper feed to conform to articles of different character from those for which the machine has been previously set, such for instance as loaves of bread of a larger size, the hand wheel 83 is rotated thereby shifting the position of carriage 77 and the levers 91 and 93, so that the swing of the gage lever 93 will be varied. It will also be noted that by reason of the arrangement of the screw threads on the shafts 78 and extensions 79, the carriage will move just twice the distance of the plate 102. This is because the carriage must be adjusted to correspond to the entire width of the article B, whereas the plate 102, being adjusted with respect to the middle of the space between it and the plate 104, only needs to move one-half the distance. As the carriage is adjusted the lever 93 rocks on the cam roller 105 as a fulcrum. These adjustments will be more readily understood by reference to Fig. 16, the dot-dash lines a—b representing the extreme positions assumed by the different parts of levers 91 and 93, and carriage 77, after such adjustment has been made. The adjustments herein described contemplate giving the wrapper W a certain lap at the edges when the wrapping operation has been completed. If however it is desired to vary the amount of lap, the required variation may be obtained by adjusting the abutment screw 114 carried by the gage lever 93.

Mounted to rotate in the frame 61 is an elevator member 200, preferably of rectangular form and provided at the corners with slotted extensions 201 which loosely receive shafts 202 to which are secured central platform members 204 and end depending arms 203. The lower portions of these arms are weighted so as to maintain the platform members 204 in a normally horizontal position as the member 200 rotates. Vertical guides 205 are arranged parallel with the plates 103, which plates have end guiding members 103ª, see Fig. 15, which guides 205 engage the shafts 202 and additional guides 205ª engage laterally extended guide rolls 202ª secured to arms 203. In this manner oscillation of the platform members 204 in their upward movement is prevented. An intermittent step by step movement is imparted to the elevator carrier 200 by means of a pawl 206 engaging ratchet teeth 207 formed on a collar connected with the member 200, said pawl being rocked by a rod 208 connected with an eccentric 209 secured to the main shaft 62. A vertical short shaft 210 is fixed in and extends downward from the cross frame 61ª and on the shaft is rotatably mounted a turret head 211 provided with arms 212 to which are secured carriers 213. Each carrier (see Figs. 24 to 29) comprises a head 213ª provided with arms 214 to which are pivotally supported the top end-flap folders 215, said folders being normally pressed inward by spring pressed pins 216. Said head is also provided with arms 217 to which are secured frictional holding plates 218, 219, the latter being pivoted at 220 and normally pressed inward by a spring pressed pin 221. To each end of each plate 218, 219 is pivoted a side end-flap folder 222 each provided with a cam groove 223 to receive a pin 224 carried by an operating rod 225. Said rod is guided by a suitable sleeve 226 chambered to receive the spring 227 which normally retains said rod 225 in an elevated position said rod being prevented from turning by pin 227ª which slides in its slot 228ª thereby holding the folders 222 open or in alinement with the plates 218—219 respectively (see Fig. 24). Pivoted at 220 is a supporting member 228, see Fig. 27, having inturned lips 229 adapted to pass under the articles to be wrapped, said member 228 being provided with an overhanging operating finger 230. The lips are normally held in supporting position by a spring pressed pin 221ª. The arms 214 and 217 are adjustably secured in the head 213ª of the carrier, said arms being retained in adjusted position by a suitable binding screw 214ª. In this manner the size of the carrier may be varied to receive articles of different dimensions. If desired the arms 212 may be forked to receive the shank of a binding screw 231 carried by the head of each carrier 213, whereby the latter may be removably secured in position. A cam plate 232 is located above the path of movement of the upper ends of the rods 225, the latter being provided with rollers 233 to reduce friction, the cam plate being a little higher on one side at the start, so that when the rods are pressed downward by this cam plate the flap folders 222 of member 219 will operate just before the corresponding folders of member 218 are actuated so as to fold one flap just ahead of the other into the positions illustrated in Figs. 35 and 36.

The turret head 211 is provided with a ratchet 235 having teeth corresponding in number with the arms 212, said teeth being engaged by a spring pressed pawl 234 supported by an arm 240 mounted on shaft 210 and actuated by an eccentric 237 through rod 236. The said eccentric is rotated from the main shaft 62 through shaft 238 and upright shaft 250 to operate in time with the feeding or elevating mechanism. Movement of the turret head 211 is normally prevented by means of a spring pressed locking pawl 239 which is periodically released by the return stroke of arm 240. It will be noted that the forward wall of each recess in ratchet 235 is longer than the rear wall, the relative arrangement of the locking pawl 239 and the walls of such recesses being such that but a slight movement of said pawl is required to unlock the head 211. In the event of any reverse movement of the turret head 211 the same will be interrupted by reason of the pawl 239 intercepting the longer wall of the contiguous ratchet recess during the reverse movement of the feeding pawl 234.

From the foregoing it will be seen that the movement of each platform member 204 in the elevator 200 is arrested at the proper time to permit an article B to be delivered thereon, as shown in dotted lines in Fig. 14. After the article has been thus positioned the elevator member 200 is moved the next step, elevating the article B into its carrier. During the upward movement of said article the wrapper W is encountered and folded around the sides of the article by the plates 102 and 104 (see Fig. 31), the said article being forced between the side plates 218 and 219 in one of the carriers 213. As the article enters this carrier the top end-flap folder plates 215 encounter the wrapper W, folding the top end flaps downward in the positions illustrated in Figs. 33 and 34. After the article has been forced into the carrier the overhanging portion 230 of supporting member 228 is released from a cam 230ª by the forward movement of turret 211 permitting lip 229 to pass under the article and prevent accidental withdrawal thereof. As the turret head 211 is being rotated a further step the rods 225 pass beneath the broad horizontal cam plate 232, and are forced downward which action owing to the pin 224 working in the cam slot 223 causes said rods to make a quarter turn and the folder plates 222 to swing inwardly one just before the other and thereby fold the side end-flaps as illustrated in Figs. 35 and 36. It will be noted that actuating means of the turret head 211 and the actuating means of the elevator member 200 are so related that the elevator member is at rest while the turret head is moving and vice versa.

A cam 251 is secured to the shaft 250 and arranged to oscillate a bell crank lever 252, one arm of said bell crank lever being connected with a standard 253 provided with a rack 254 (see Fig. 10ª). Said standard supports a bottom side-flap folder 255, and the rack 254 meshes with a pinion 256 which actuates a second rack 257 for the purpose of operating a second bottom side-flap folder 258. Movement of rack 254 oscillates pinion 256 thereby imparting movement to folder 258, the two folders moving in parallel planes in opposite directions. The folder 255 is somewhat longer than folder 258 and acts upon the wrapper in advance of the last mentioned folder, being supported by a roller 258ª the two folders overlapping as their folding functions are completed. It is obvious, however, that this arrangement may be reversed. Another cam 251ª is also arranged to actuate an arm 259 connected to a crank arm 261 secured to a pinion 260, and said pinion meshes with a pair of oppositely disposed racks 262 carrying pivoted bottom end-flap folders 263, 263ª. Trip devices 264 are arranged to engage the lower ends of said folders as the latter are moved toward each other by the pinion 261 through racks 262.

After the article B has been placed in the carrier 213 as hereinbefore described, and the wrapper folded to the position indicated in Fig. 36, the travel of the turret head 211 brings the article opposite the bottom side-flap folders 255 and 258 and the bottom end-flap folders 263—263ª. A quick movement is now imparted to the folders 263—263ª through their respective racks, causing them to engage the bottom end flaps and fold them in the manner illustrated in Figs. 38 and 39. The movement of the rack members 262 is in parallel planes but in opposite directions. The arrangement is such that when the carrier 213 is moving to the position to permit the wrapper to be operated upon by folders 263 263ª the folder 263ª is in a position to be cleared by the depending flap of the wrapper. As the carrier 213 progresses however, the racks 262 begin to bring the folders 263 and 263ª toward each other until said folders engage the trip devices 264. Continued movement of the racks causes said trip devices to impart a sudden forward movement to the folding devices 263, 263ª thereby effecting the folding over of the bottom end flaps. It will be seen that during the first portion of the effective folding stroke the folders 263, 263ª move in a substantially straight line which is due to the fact that their pivoting points are also moving in the same direction as the operating ends, the folding functions being completed by a sudden inward and downward movement of the folders 263, 263ª in time to permit the bottom side folders 255, 258 to operate without interfering. As the operation of folders 263, 263ª is completed the folders 255 and 258 are actuated in an obvious manner to fold the bottom side flaps to the positions indicated in Fig. 41.

After the folding operation has been completed the wrapped article by another rotating step of the turret is passed over a plate 270. If desired the wrapper may be made of a suitable paraffin paper which will adhere when heat is applied thereto. In such case the plate 270 may be heated in any suitable manner, a gas burner G being illustrated for this purpose in Fig. 2. Sufficient pressure may be then applied to cause the heated overlapping edges of the wrapper to adhere, thus completing the wrapping operation when such a sealing is employed. The next step of the turret 211 brings the carrier 213 opposite the ejector 271. Said ejector comprises a reciprocating member preferably of fork-shape and provided with a rack 272, actuated by a gear 273, which in turn is oscillated by a rack 274 through the pinion 274ª, reciprocated by a cam 275, on shaft 250, and connected with the rack by a bell crank lever 276 and connecting rod 277. As the carrier 213 comes opposite the ejector 271 a cam 278 engages the overhanging arm 230 of the holder 228 withdrawing the same from engaging position thus permitting the downward movement of the ejector to force the wrapped article out of said carrier. The ejector may also be provided with a notch or recess 279 having bevel side walls arranged to engage a correspondingly beveled portion 279ª of the arms 212 of turret 211 so as to position and lock said turret accurately centering one of its carriers 213 in proper position to receive the article and its wrapper from the elevator.

If desired the supply of the paper may be governed by a suitable device. In the drawing, see Figs. 5 and 6, I have illustrated a short shaft 281ª fixed in the main frame at 281ᵇ. On the outer end of this short shaft is mounted a roll shaft receiving member 289ª which is provided with a slotted socket at its outer end and a hub portion extending inward to form a bearing on the said shaft 281ª. On this member is loosely mounted the hub 281 which supports an arm 284 the same being provided with a counterweight 283 at one end, the other end extending outward a short distance and being bent parallel with the roll shaft 72 to form a tension arm 73ª over which the paper is drawn. If desired the counterweight may be supplemented by an adjustable spring 283ª. Loosely mounted on shaft 281ª is an arm 285 connected by a connecting rod 286 with an eccentric 287 on the sleeve 107ª. Said arm 285 is also provided with a pivoted pawl 288 coöperating with a ratchet 289 which latter is secured to the hub of roll shaft receiving member 289ª. Secured to hub 281 is a cam 290 which engages a pin 291 carried by said pawl 288. The eccentric 287 oscillates the arm 285 but as long as the high side of the cam 290 is in engagement with the pin 291 the pawl may not engage the ratchet wheel 289. When however, the wrapping material 70 is being fed forward by the feed rolls the arm 284 is being drawn downward thereby, thus moving the cam 290 into position to permit the constantly reciprocating pawl 288 to engage and rotate the ratchet 289. Thus the pawl rotates the ratchet and the roll to unwind the paper therefrom and this operation continues until the arm 284 returns to its normal position and the cam 290 rotated by the returning tension arm raises the pawl 288 from its ratchet, when sufficient paper has been unwound from the roll to permit said arm to return to its normal position. Thus the amount of wrapping material unwound from the roll corresponds with the amount fed forward by the rolls 75, 76 at the last wrapping operation. It is also a common experience in machines of this character for the paper to get out of alinement as it is fed, largely because of the fact that one edge of the web is frequently slightly thicker than the other. To counteract this the shaft 72 has one end mounted in a bearing box 301, which is slidingly mounted in a suitable guide 302, the adjustment being effected by means of a screw 303. By this arrangement the roll may be adjusted so that its surface is parallel with the axes of the feed rollers.

I claim:

1. In a wrapping machine, the combination with wrapping mechanism, of means for feeding the articles to be wrapped, wrapper feeding mechanism, a gage lever, means operated by said gage lever for actuating said feeding mechanism, and means actuated by the articles to be wrapped for limiting the movement of said gage lever.

2. In a wrapping machine, the combination with wrapping mechanism, of means for feeding the articles to be wrapped, wrapper feeding mechanism, a gage lever, means operated by said gage lever for actuating said feeding mechanism, and a measuring member actuated by contact with the articles being fed.

3. In a wrapping machine, the combination with wrapping mechanism, of means for feeding the articles to be wrapped, wrapper feeding mechanism, a gage lever, means operated by said gage lever for actuating said feeding mechanism, and a measuring member for limiting the movement of said gage lever, said measuring member being provided with means for successively engaging the articles to be wrapped, whereby the same is actuated.

4. In a wrapping machine, the combination with wrapping mechanism, of means for feeding the articles to be wrapped, wrapper feeding mechanism, a gage lever, means operated by said gage lever for actuating said feeding mechanism, and a measuring member having a cam for limiting the movement of said gage lever, said measuring member being also provided with an operating arm arranged to successively engage the articles to be wrapped.

5. In a wrapping machine the combination with wrapping mechanism, of means for feeding the articles to be wrapped, wrapper feed rolls, a rack for actuating said feed rolls, means for reciprocating said rack, and means controlled by the size of the article to be wrapped for varying the operation of said rack.

6. In a wrapping machine the combination with wrapping mechanism, of means for feeding the articles to be wrapped, wrapper feed rolls, a rack for actuating said feed rolls, means for reciprocating said rack, and a measuring member actuated by the articles to be wrapped and controlling the operation of said rack.

7. In a wrapping machine the combination with wrapping mechanism, of means for feeding the articles to be wrapped, wrapper feed rolls, a rack for actuating said feed rolls, means for reciprocating said rack, and a measuring member for controlling said rack, said measuring member being provided with an operating arm arranged to engage the articles to be wrapped.

8. In a wrapping machine the combination with wrapping mechanism, of means for feeding the articles to be wrapped, wrapper feed rolls, a rack for actuating said feed rolls, a gage lever connected with said rack, means for oscillating said gage lever, and means controlled by the size of the article to be wrapped for limiting the movement of said gage lever.

9. In a wrapping machine the combination with wrapping mechanism, of means for feeding the articles to be wrapped, wrapper feed rolls, a rack for actuating said feed rolls, a gage lever connected with said rack, means for oscillating said gage lever, and a measuring member controlled by the size of the article to be wrapped for limiting the movement of said gage member.

10. In a wrapping machine the combination with wrapping mechanism, of means for feeding the articles to be wrapped, wrapper feed rolls, a rack for actuating said feed rolls, a gage lever connected with said rack, means for oscillating said gage lever, and a measuring member for limiting the movement of said gage lever, said measuring member being provided with an arm arranged to engage the articles to be wrapped.

11. In a wrapping machine, the combination with wrapping mechanism, of means for feeding the articles to be wrapped, wrapper feeding mechanism, a gage lever, means operated by said gage lever for actuating said feeding mechanism, means actuated by contact with the articles being fed for limiting the movement of said gage lever, and an adjustable abutment carried by said gage lever and coöperating with said controlling means.

12. In a wrapping machine, the combination with wrapping mechanism, of means for feeding the articles to be wrapped, wrapper feeding mechanism, a gage lever, means operated by said gage lever for actuating said feeding mechanism, and a measuring member actuated by contact with the articles being fed for limiting the movement of said gage lever, and an adjustable abutment carried by said gage lever and coöperating with said measuring member.

13. In a wrapping machine, the combination with wrapping mechanism, of means for feeding the articles to be wrapped, wrapper feeding mechanism, a gage lever, means operated by said gage lever for actuating said feeding mechanism, a measuring member actuated by contact with the articles being fed for limiting the movement of said gage lever, and means controlled by said measuring member for operating said gage lever.

14. In a wrapping machine, the combination with wrapping mechanism, of means for feeding the articles to be wrapped, wrapper feeding mechanism, a gage lever, means operated by said gage lever for actuating said feeding mechanism, a measuring member actuated by contact with the articles being fed for limiting the movement of said gage lever, a cam for actuating said gage lever, and means connected with said measuring member for controlling said cam.

15. In a wrapping machine, the combination with wrapping mechanism, of means for feeding the articles to be wrapped, wrapper feeding mechanism, a gage lever, means operated by said gage lever for actuating said feeding mechanism, a measuring member actuated by contact with the articles being fed for limiting the movement of said gage lever, a cam for actuating said gage lever, a clutch pawl controlling said cam, a latch member controlling said pawl, and connections between said latch member and said measuring member.

16. In a wrapping machine, the combination with wrapping mechanism, of means for feeding the articles to be wrapped, wrapper feeding mechanism, a gage lever, means operated by said gage lever for controlling the operation of said feeding mechanism, an operating lever connected with said gage lever, means for oscillating said operating lever, and means connected with said gage lever controlled by contact with the articles being fed for controlling said oscillating means.

17. In a wrapping machine the combination with wrapping mechanism, of means for feeding the articles to be wrapped, a carriage, means for adjusting said carriage relative to the wrapping mechanism, wrapper feeding mechanism supported by said carriage, and means supported by said carriage for varying the operation of said wrapper feeding mechanism to conform to the varying sizes of the articles to be wrapped.

18. In a wrapping machine the combination with wrapping mechanism, of means for feeding the articles to be wrapped, a carriage, means for adjusting said carriage relative to the wrapping mechanism, wrapper feeding mechanism supported by said carriage, and a measuring member supported by said carriage and provided with means for varying the operation of said wrapper feeding mechanism, said measuring member being also provided with means for engaging the articles to be wrapped.

19. In a wrapping machine the combination with wrapping mechanism, of means for feeding the articles to be wrapped, a carriage, means for adjusting said carriage relative to the wrapping mechanism, wrapper feeding mechanism supported by said carriage, a gage lever connected to said carriage and controlling said wrapper feeding mechanism, and a measuring member actuated by contact with the articles being fed for interrupting the movement of said gage lever.

20. In a wrapping machine the combination with wrapping mechanism, of means for feeding the articles to be wrapped, a carriage, means for adjusting said carriage relative to the wrapping mechanism, wrapper feeding mechanism supported by said carriage, a gage lever connected to said carriage and controlling said wrapper feeding mechanism, and a measuring member actuated by contact with the articles being fed for interrupting the movement of said gage lever, said measuring member being supported by said carriage.

21. In a wrapping machine the combination with wrapping mechanism, of means for feeding the articles to be wrapped, a carriage, means for adjusting said carriage relative to the wrapping mechanism, wrapper feeding mechanism supported by said carriage, a gage lever connected to said carriage and controlling said wrapper feeding mechanism, and a measuring member for interrupting the movement of said gage lever, said measuring member being provided with means for engaging the articles to be wrapped.

22. In a wrapping machine the combination with wrapping mechanism, of means for feeding the articles to be wrapped, a carriage, means for adjusting said carriage relative to the wrapping mechanism, wrapper feeding mechanism supported by said carriage, a gage lever connected with said carriage, a rack connected with said gage lever and arranged to operate said wrapper feeding mechanism and a measuring member actuated by contact with the articles being fed for interrupting the movement of said gage member.

23. In a wrapping machine the combination with wrapping mechanism, of means for feeding the articles to be wrapped, a carriage, means for adjusting said carriage relative to the wrapping mechanism, wrapper feeding mechanism supported by said carriage, a gage lever connected with said carriage, a rack connected with said gage lever and arranged to operate said wrapper feeding mechanism and a measuring member for interrupting the movement of said gage member, said measuring member being provided with means for engaging the articles to be wrapped.

24. In a wrapping machine the combination with wrapping mechanism, of means for feeding the articles to be wrapped, a carriage, means for adjusting said carriage relative to the wrapping mechanism, wrapper feeding mechanism supported by said carriage, a gage lever provided with means for actuating said wrapper feeding mechanism, an operating lever connecting said gage lever and said carriage, and a measuring member actuated by contact with the articles being fed for interrupting the movement of said gage lever.

25. In a wrapping machine the combination with wrapping mechanism, of means for feeding the articles to be wrapped, a carriage, means for adjusting said carriage relative to the wrapping mechanism, wrapper feeding mechanism supported by said carriage, a gage lever provided with means for actuating said wrapper feeding mechanism, an operating lever connecting said gage lever and said carriage, a cam for actuating said operating lever, and a measuring member for interrupting the movement of said gage lever, said measuring member actuated by contact with the articles being fed being provided with means for controlling said cam.

26. In a wrapping machine the combination with wrapping mechanism, of means for feeding the articles to be wrapped, a carriage, means for adjusting said carriage relative to the wrapping mechanism, wrapper feeding mechanism supported by said carriage, a gage lever provided with means for actuating said wrapper feeding mechanism, an operating lever connecting said gage lever and said carriage, a cam for actuating said operating lever, and a measuring member for interrupting the movement of said gage lever, said measuring member being provided with means for controlling said cam, said measuring member being supported by said carriage and provided with means for engaging the articles to be fed.

27. In a wrapping machine the combination with wrapping mechanism provided with an adjustable folder member, of means for feeding the articles to be wrapped, a carriage, means for relatively adjusting said carriage and said folder member, wrapper feeding mechanism supported by said carriage, and means for varying the operation of said wrapper feeding mechanism to conform to the varying sizes of the articles to be wrapped.

28. In a wrapping machine the combination with wrapping mechanism provided with an adjustable folder member, of means for feeding the articles to be wrapped, a carriage, means for adjusting said carriage with relation to said folding mechanism, and means for simultaneously adjusting said folder member in proportion to the adjustment of said carriage, wrapper feeding mechanism supported by said carriage, and means for varying the operation of said wrapper feeding mechanism to conform to the varying sizes of the articles to be wrapped.

29. In a wrapping machine the combination with wrapping mechanism provided with an adjustable folder member, of means for feeding the articles to be wrapped, a carriage, adjusting screws for said carriage, adjusting screws for said folder member definitely proportioned relative to the first mentioned screws, means for simultaneously operating said screws, wrapper feeding mechanism supported by said carriage, and means for varying the operation of said wrapper feeding mechanism to conform to the varying sizes of the articles to be wrapped.

30. In a wrapping machine the combination with wrapping mechanism provided with an adjustable folder member, of means for feeding the articles to be wrapped, a carriage, adjusting screws for said carriage provided with threaded extensions engaging said folder member, the threads of said extensions bearing a predetermined ratio to the threads of said screws, means for operating said screws, wrapper feeding mechanism supported by said carriage, and means for varying the operation of said wrapper feeding mechanism to conform to the varying sizes of the articles to be wrapped.

31. In a wrapping machine the combination with wrapping mechanism, means for supplying wrappers, and means controlled by the passage of the article to be wrapped for adjusting a sheet of wrapping material relative to the position of the path or travel of said article.

32. In a wrapping machine the combination with wrapping means, of means for feeding and severing a strip of wrapping material, and means controlled by the passage of the article to be wrapped for centralizing the severed sheet relative to the path of travel of said article.

33. In a wrapping machine the combination with wrapping means, of means for feeding and severing a strip of wrapping material, and means controlled by the article to be wrapped for subsequently adjusting the severed sheet in the direction of its feed.

34. In a wrapping machine the combination with wrapping means, of means for centralizing the severed sheet relative to the article to be wrapped by it, and means for determining the extent of the centralizing movement by the height of the entering article.

35. In a wrapping machine the combination with wrapping means, means for feeding and severing a strip of wrapping material, sheet centralizing fingers, and a measuring member controlled in its position by the height of the entering article to determine the extent of movement of said fingers.

36. In a wrapping machine the combination with wrapping mechanism, of means for feeding the articles to be wrapped, means for supplying wrappers, means for positioning the wrappers, means operated by the articles to be wrapped for controlling said positioning means.

37. In a wrapping machine the combination with wrapping mechanism, of means for feeding the articles to be wrapped, means for supplying wrappers, means for positioning the wrappers, and a measuring member for controlling said positioning means, said measuring member being provided with means for engaging the articles to be wrapped.

38. In a wrapping machine the combination with wrapping mechanism, of means for supplying the articles to be wrapped, means for supplying wrappers, wrapper positioning fingers, means for actuating said fingers, and means for automatically varying the operative position of said fingers to conform to differing sizes of the articles to be wrapped.

39. In a wrapping machine the combination with wrapping mechanism, of means for supplying the articles to be wrapped, means for supplying wrappers, wrapper positioning fingers, means for actuating said fingers, and a measuring member operated by the articles to be wrapped and controlling the operative positions of said fingers.

40. In a wrapping machine the combination with wrapping mechanism, of means for supplying the articles to be wrapped, means for supplying wrappers, wrapper positioning fingers, means for actuating said fingers, and a measuring member controlling the operative position of said fingers, said measuring member being provided with means for engaging the articles to be wrapped.

41. In a wrapping machine, the combination with wrapping mechanism, of means for supplying the articles to be wrapped, means for supplying wrappers, a rock shaft, wrapper positioning fingers secured to said rock shaft, means for actuating said rock shaft, and means for imparting a preliminary movement to said rock shaft to vary the operative position of said fingers.

42. In a wrapping machine, the combination with wrapping mechanism, of means for supplying the articles to be wrapped, means for supplying wrappers, a rock shaft, wrapper positioning fingers secured to said rock shaft, means for actuating said rock shaft, a measuring member operated by the articles to be wrapped, and means operated by said measuring member for imparting a preliminary adjusting movement to said rock shaft.

43. In a wrapping machine, the combination with wrapping mechanism, of means for supplying the articles to be wrapped, means for supplying wrappers, a rock shaft, wrapper positioning fingers secured to said rock shaft, means for actuating said rock shaft, a measuring member provided with an arm for engaging the articles to be wrapped, and means operated by said measuring member for imparting a preliminary adjusting movement to said rock shaft.

44. In a wrapping machine, the combination with wrapping mechanism, of means for supplying the articles to be wrapped, means for supplying wrappers, a rock shaft, wrapper positioning fingers secured to said rock shaft, means for actuating said rock shaft, a crank arm connected with said rock shaft, a measuring member operated by the articles to be wrapped, and a lost motion connection between said measuring member and said crank arm.

45. In a wrapping machine the combination with wrapping mechanism, of means for supplying the articles to be wrapped, means for supplying wrappers, wrapper positioning fingers, a cam for oscillating said fingers, and means independent of said cam for varying the operative position of said fingers.

46. In a wrapping machine the combination with wrapping mechanism, of means for supplying the articles to be wrapped, means for supplying wrappers, wrapper positioning fingers, a cam for oscillating said fingers, a measuring member operated by the articles to be wrapped, and means actuated by said measuring member for varying the operative position of said fingers.

47. In a wrapping machine the combination with wrapping mechanism, of means for supplying the articles to be wrapped, means for supplying wrappers, wrapper positioning fingers, a cam for oscillating said fingers, and means independent of the said cam for successively varying the operative position of said fingers immediately before each operation.

48. In a wrapping machine the combination with wrapping mechanism, of means for supplying the articles to be wrapped, means for supplying wrappers, a rock shaft, wrapper positioning fingers supported by said rock shaft, a cam for oscillating said rock shaft, and means independent of the cam for acting on said shaft to successively vary the operative positions of said fingers.

49. In a wrapping machine the combination with wrapping mechanism, of means for supplying the articles to be wrapped, means for supplying wrappers, a rock shaft, wrapper positioning fingers supported by said rock shaft, a link for oscillating said rock shaft, a cam for actuating said link, said cam and link being provided with a lost motion connection, and means independent of the cam for acting on said shaft to successively vary the operative positions of said fingers.

50. In a wrapping machine the combination with wrapping mechanism, of means for supplying the articles to be wrapped, means for supplying wrappers, a rock shaft, wrapper positioning fingers supported by said rock shaft, a link connected at one end to said rock shaft and slotted at the other end, a cam engaging the slotted end of said link, and means for successively varying the operative positions of said fingers.

51. In a wrapping machine the combination with wrapping mechanism, of means for supplying the articles to be wrapped, means for supplying wrappers, a rock shaft, wrapper positioning fingers supported by said rock shaft, a cam for oscillating said rock shaft, and a measuring member provided with means for varying the operative position of said fingers prior to each operation.

52. In a wrapping machine the combination with wrapping mechanism, of means for supplying the articles to be wrapped, means for supplying wrappers, a rock shaft, wrapper positioning fingers supported by said rock shaft, a link for oscillating said rock shaft, a cam for actuating said link, said cam and link being provided with a lost motion connection, and a measuring member provided with means for varying the operative position of said fingers prior to each operation.

53. In a wrapping machine the combination with wrapping mechanism, of means for supplying the articles to be wrapped, means for supplying wrappers, a rock shaft, wrapper positioning fingers supported by said rock shaft, a cam for oscillating said rock shaft, and a measuring member provided with means for varying the operative position of said fingers prior to each operation, said measuring member being provided with an arm for engaging the articles to be wrapped.

54. In a wrapping machine the combination with wrapping mechanism, of means for supplying the articles to be wrapped, means for supplying wrappers, a rock shaft, rapper positioning fingers supported by said rock shaft, a link for oscillating said rock shaft, a cam for actuating said link, said cam and link being provided with a lost motion connection, and a measuring member provided with means for varying the operative position of said fingers prior to each operation, said measuring member being provided with an arm for engaging the articles to be wrapped.

55. In a wrapping machine the combination with wrapping mechanism, of means for supplying the articles to be wrapped, wrapper feed mechanism, wrapper placing mechanism, and means controlled by the size of the article to be wrapped for controlling said feed and placing mechanisms.

56. In a wrapping machine the combination with wrapping mechanism, of means for supplying the articles to be wrapped, wrapper feed mechanism, wrapper placing mechanism, a measuring member, and means coöperating with said measuring member for controlling said feed and placing means.

57. In a wrapping machine the combination with wrapping mechanism, of means for supplying the articles to be wrapped, wrapper feed mechanism, wrapper positioning fingers, a measuring member, and means coöperating with said measuring member for controlling said wrapper positioning fingers and said wrapper feeding mechanism.

58. In a wrapping machine the combination with wrapping mechanism, of means for supplying the articles to be wrapped, means for supplying wrappers, wrapper positioning fingers, means for actuating said fingers, and a measuring member operated by the articles to be wrapped and controlling the operative positions of said fingers, and means coöperating with said measuring member for controlling said wrapper supplying means.

59. In a wrapping machine the combination with wrapping mechanism, of means for supplying the articles to be wrapped, means for supplying wrappers, wrapper positioning fingers, means for actuating said fingers, a measuring member controlling the operative position of said fingers, said measuring member being provided with means for engaging the articles to be wrapped, and means coöperating with said measuring member for controlling said wrapper supplying means.

60. In a wrapping machine, the combination with wrapping mechanism, of means for supplying the articles to be wrapped, means for supplying wrappers, a rock shaft, wrapper positioning fingers secured to said rock shaft, means for actuating said rock shaft, a measuring member operated by the articles to be wrapped, means operated by said measuring member for imparting a preliminary adjusting movement to said rock shaft, and means coöperating with said measuring member for controlling said wrapper supplying means.

61. In a wrapping machine, the combination with wrapping mechanism, of means for supplying the articles to be wrapped, means for supplying wrappers, a rock shaft, wrapper positioning fingers secured to said rock shaft, means for actuating said rock shaft, a measuring member provided with an arm for engaging the articles to be wrapped, means operated by said measuring member for imparting a preliminary adjusting movement to said rock shaft, and means coöperating with said measuring member for controlling said wrapper supplying means.

62. In a wrapping machine the combination with wrapping mechanism, of means for supplying the articles to be wrapped, means for supplying wrappers, wrapper positioning fingers, a cam for oscillating said fingers, a measuring member operated by the articles to be wrapped, means actuated by said measuring member for varying the operative position of said fingers, and means coöperating with said measuring member for controlling said wrapper supplying means.

63. In a wrapping machine the combination with wrapping mechanism, of means for supplying the articles to be wrapped, means for supplying wrappers, a rock shaft, wrapper positioning fingers supported by said rock shaft, a cam for oscillating said rock shaft, a measuring member provided with means for varying the operative position of said fingers prior to each operation, and means coöperating with said measuring member for controlling said wrapper supplying means.

64. In a wrapping machine the combination with wrapping mechanism, of means for supplying the articles to be wrapped, means for supplying wrappers, a rock shaft, wrapper positioning fingers supported by said rock shaft, a link for oscillating said rock shaft, a cam for actuating said link, said cam and link being provided with a lost motion connection, a measuring member provided with means for varying the operative position of said fingers prior to each operation, and means coöperating with said measuring member for controlling said wrapper supplying means.

65. In a wrapping machine the combination with wrapping mechanism, of means for supplying the articles to be wrapped, means for feeding wrapping material, means for severing the wrapping material to form wrappers, a gage lever controlling the operation of said wrapper feeding mechanism, and a measuring member actuated by contact with the articles being fed for governing the operation of said lever.

66. In a wrapping machine the combination with wrapping mechanism, of means for supplying the articles to be wrapped, means for feeding wrapping material, means for severing the wrapping material to form wrappers, a gage lever controlling the operation of said wrapper feeding mechanism, and a measuring member for governing the operation of said lever, said measuring member being provided with an arm adapted to engage the articles to be wrapped.

67. In a wrapping machine the combination with wrapping mechanism, of means for supplying the articles to be wrapped, means for feeding wrapping material, means for severing the wrapping material to form wrappers, and a measuring member for controlling the amount of wrapping material fed in each operation, wrapper positioning fingers, and means actuated by said measuring member for varying the operative position of said fingers.

68. In a wrapping machine the combination with wrapping mechanism, of means for supplying the articles to be wrapped, means for feeding wrapping material, means for severing the wrapping material to form wrappers, a gage lever controlling the operation of said wrapper feeding mechanism, a measuring member for governing the operation of said lever, wrapper positioning fingers, and means actuated by said measuring member for varying the operative position of said fingers.

69. In a wrapping machine the combination with wrapping mechanism, of means for supplying the articles to be wrapped, means for feeding wrapping material, means for severing the wrapping material to form wrappers, a gage lever controlling the operation of said wrapper feeding mechanism, a measuring member for governing the operation of said lever, said measuring member being provided with an arm adapted to engage the articles to be wrapped, wrapper positioning fingers, and means actuated by said measuring member for varying the operative position of said fingers.

70. In a wrapping machine the combination with wrapping mechanism, of means for supplying the articles to be wrapped, means for supplying wrapping material, a carriage, feed rolls mounted in said carriage and engaging said wrapping material, cutting mechanism supported by said carriage, means operated by contact with the articles being fed for controlling the operation of said feed rolls, and means for operating said cutting mechanism in time with said feed rolls.

71. In a wrapping machine the combination with wrapping mechanism, of means for supplying the articles to be wrapped, means for supplying wrapping material, a carriage, feed rolls mounted in said carriage and engaging said wrapping material, cutting mechanism supported by said carriage, a measuring member operated by contact with the articles being fed controlling the operation of said feed rolls, and means for operating said cutting mechanism in time with said feed rolls.

72. In a wrapping machine the combination with wrapping mechanism, of means for supplying the articles to be wrapped, means for supplying wrapping material, a carriage, feed rolls mounted in said carriage and engaging said wrapping material, cutting mechanism supported by said carriage, a lever for operating said cutting mechanism, means operated by contact with the articles being fed for controlling the operation of said feed rolls, and means for operating said lever in time with the actuation of said feed rolls.

73. In a wrapping machine the combination with wrapping mechanism, of means for supplying the articles to be wrapped, means for supplying wrapping material, a carriage, feed rolls mounted in said carriage and engaging said wrapping material, a cutter bar supported by said carriage, a clamp bar connected with said cutter bar, means operated by contact with the articles being fed for controlling the operation of said feed rolls, and means for operating said cutter bar and clamp bar in time with said feed rolls.

74. In a wrapping machine the combination with wrapping mechanism, of means for supplying the articles to be wrapped, means for supplying wrapping material, a carriage, feed rolls mounted in said carriage and engaging said wrapping material, a cutter bar supported by said carriage, a clamp bar connected with said cutter bar, means operated by contact with the articles being fed for controlling the operation of said feed rolls, means for operating said cutter bar and clamp bar in time with said feed rolls, and means for imparting a yielding pressure upon said clamp bar.

75. In a wrapping machine the combination with wrapping mechanism, of means for supplying the articles to be wrapped, means for supplying wrapping material, a carriage, feed rolls mounted in said carriage and engaging said wrapping material, a cutter supported by said carriage, a clamp bar having overhanging fingers engaging said cutter bar, means operated by contact with the articles being fed for controlling the operation of said feed rolls, and means for operating said clamp bar and said cutter bar in time with said feed rolls.

76. In a wrapping machine the combination with wrapping mechanism, of means for supplying the articles to be wrapped, means for supplying wrapping material, a carriage, feed rolls mounted in said carriage and engaging said wrapping material, a cutter supported by said carriage, a clamp bar having overhanging fingers engaging said cutter bar, means for controlling the operation of said feed rolls, means operated by contact with the articles being fed for operating said clamp bar and said cutter bar in time with said feed rolls, and means for imparting a yielding pressure upon said clamp bar.

77. In a wrapping machine the combination with wrapping mechanism, of means for supplying the articles to be wrapped, means for supplying wrapping material, a carriage, feed rolls mounted in said carriage and engaging said wrapping material, cutting mechanism supported by said carriage, wrapper positioning mechanism, means for controlling the operative position of said wrapper positioning mechanism and also the operation of said feed rolls, and means for operating said cutting mechanism and said positioning mechanism in time with said feed rolls.

78. In a wrapping machine the combination with wrapping mechanism, of means for supplying the articles to be wrapped, means for supplying wrapping material, a carriage, feed rolls mounted in said carriage and engaging said wrapping material, cutting mechanism supported by said carriage, wrapper positioning mechanism, a measuring member for controlling the operation of said feed rolls, means connected with said measuring member for varying the operative position of said positioning mechanism, and means for operating said cutting and positioning mechanism in time with said feed rolls.

79. In a wrapping machine, the combination with wrapping mechanism, of means for supplying the articles to be wrapped, means for supplying wrapping material, a carriage, feed rolls mounted in said carriage and engaging said wrapping material, a cutter bar supported by said carriage, a clamp bar connected with said cutter bar and provided with a presser foot, means operated by contact with the articles being fed for controlling the operation of said feed rolls and means for operating said cutter and clamp bars in time with said feed rolls.

80. In a wrapping machine the combination with wrapping mechanism, of means for supplying the articles to be wrapped, means for supplying wrappers, wrapper positioning fingers, reciprocatory needles carried by said fingers, means for actuating said fingers, means for automatically varying the operative position of said fingers prior to each operation thereof, and means for reciprocating said needles.

81. In a wrapping machine the combination with wrapping mechanism, of means for supplying the articles to be wrapped, means for supplying wrappers, wrapper positioning fingers, reciprocatory needles carried by said fingers, means for actuating said fingers, means for automatically varying the operative position of said fingers prior to each operation thereof, and a cam bar for reciprocating said needles.

82. In a wrapping machine the combination with wrapping mechanism, of means for supplying the articles to be wrapped, means for supplying wrappers, wrapper positioning fingers, reciprocatory needles carried by said fingers, means for actuating said fingers, means for automatically varying the operative position of said fingers prior to each operation thereof, a cam bar, said needles having headed ends engaging said cam bar.

83. In a wrapping machine the combination with wrapping mechanism, of means for supplying the articles to be wrapped, means for supplying wrappers, wrapper positioning fingers, reciprocatory needles carried by said fingers, means for actuating said fingers, means for automatically varying the operative position of said fingers prior to each operation thereof, cutting mechanism, means for actuating the same, and means for operating said needles in time with said cutting mechanism.

84. In a wrapping machine the combination with wrapping mechanism, of means for supplying the articles to be wrapped, means for supplying wrappers, wrapper positioning fingers, reciprocatory needles carried by said fingers, means for actuating said fingers, means for automatically varying the operative position of said fingers prior to each operation thereof, cutting mechanism, means for actuating the same, a cam bar for reciprocating said needles, and means for operating said cam bar in time with said cutting mechanism.

85. In a wrapping machine the combination with wrapping mechanism, of means for supplying the articles to be wrapped, means for supplying wrappers, wrapper positioning fingers, reciprocatory needles carried by said fingers, means for actuating said fingers, means for unseating the operative position of said fingers prior to each operation thereof, ending mechanism, of a cam bar for reciprocating said needles, and a single lever for simultaneously operating said cutting mechanism and said cam bar.

86. In a wrapping machine the combination with wrapping mechanism, of means for supplying the articles to be wrapped, means for supplying wrappers, wrapper positioning fingers, reciprocatory needles carried by said fingers, means for operating said fingers, means for automatically restoring the operative position of said fingers prior to each operation thereof, ending mechanism, a cam bar and a shaft lever for operating said cutting mechanism and said cam bar, said needles being adapted for engaging said cam bar.

87. In a wrapping machine the combination with wrapping mechanism, of means for supplying the articles to be wrapped, means for supplying wrappers, wrapper positioning fingers, reciprocatory needles carried by said fingers, means for operating said fingers, means for automatically restoring the operative position of said fingers prior to each operation thereof, ending mechanism, of a cam bar for reciprocating said needles, and a single lever for simultaneously operating said cutting mechanism and said cam bar, and means for actuating said lever in time with said wrapper supplying means.

88. In a wrapping machine the combination with ... provided with trip portions ... able pivot rods for said fingers ... vided with a trip portion and ... provided with a cam ... engaging one of said projections.

89. In a wrapping machine the combination with means for ... an intermittent rotatable turret head, means for operating said head in time with said wrapper feed, a carrier means on said head, means for depositing the article to be wrapped together with its wrapping material in said carrier means to said carrier, partially folding the wrapper ... completing the wrapping at the next succeeding station, and means operating in time with said turret for ejecting the wrapped article.

90. A wrapping machine comprising means for supplying wrappers, means for supplying the articles to be wrapped, a rotatable turret, carriers for supporting said articles and provided with means for folding the top and side end-flaps of the wrapper, oppositely reciprocating racks, bottom end flap folders pivotally supported by said racks, means for actuating said racks in time with said turret, and means independent of the racks for periodically actuating said bottom end flap folders.

91. A wrapping machine comprising means for supplying wrappers, means for supplying the articles to be wrapped, a rotatable turret, carriers for supporting said articles and provided with means for folding the top and side end-flaps of the wrapper, oppositely reciprocating racks, bottom end flap folders supported by said racks and provided with trip portions, means for engaging said trip portions to operate said folders, and means for actuating said racks in time with said turret.

92. A wrapping machine comprising means for supplying wrappers, means for supplying the articles to be wrapped, a rotatable turret, carriers for supporting said articles and provided with means for folding the top and side end-flaps of the wrapper, oppositely reciprocating racks, bottom end flap folders supported by said racks and provided with trip portions, means for engaging said trip portions to operate said folders, means for actuating said racks in time with said turret, and means operated by said cam for oscillating said turret.

93. A wrapping machine comprising means for supplying wrappers, means for supplying the articles to be wrapped, a rotatable turret, carriers for supporting said articles and provided with means for folding the top and side end-flaps of the wrapper, oppositely reciprocating racks, bottom end flap folders pivotally supported by said racks, means for actuating said racks in time with said turret, means independent of the racks for periodically actuating said bottom end flap folders, and bottom side flap folders operating in time with said bottom end flap folders.

94. A wrapping machine comprising means for supplying wrappers, means for supplying the articles to be wrapped, a rotatable turret, carriers for supporting said articles and provided with means for folding the top and side end-flaps of the wrapper, oppositely reciprocating racks, bottom end flap folders supported by said racks and provided with trip portions, means for engaging said trip portions to operate said folders and means for actuating said racks in time with said turret, and bottom side flap folders operating in time with said bottom end flap folders.

95. A wrapping machine comprising means for supplying wrappers, means for supplying the articles to be wrapped, a rotatable turret, carriers for supporting said articles and provided with means for folding the top and side end-flaps of the wrapper, oppositely reciprocating racks, bottom end flap folders supported by said racks and provided with trip portions, means for engaging said trip portions to operate said folders, a pinion for actuating said racks, a cam operating in time with said turret, means operated by said cam for oscillating said pinion, and bottom side flap folders operating in time with said bottom end flap folders.

96. A rotatable turret member provided with carriers, a rotatable elevator member for successively placing the articles to be wrapped into said carriers, and means for locking either member while the other is moving.

97. A rotatable turret member provided with carriers, a rotatable elevator member for successively placing the articles to be wrapped into said carriers, and provided with platform members, and means for locking either rotatable member while the other is moving.

98. A rotatable turret member provided with carriers, a rotatable elevator member for successively placing the articles to be wrapped into said carriers, and provided with platform members corresponding in number with said carriers, and means for locking either rotatable member while the other is moving.

99. A horizontally disposed rotatable turret member provided with carriers, a vertically disposed rotatable elevator member, and means for locking either member while the other is moving.

100. In a wrapping machine the combination of means for supplying wrappers, means for supplying the articles to be wrapped, a rotatable turret provided with carriers, elevator members provided with slotted extensions, shafts mounted in the slots of said extensions, platform members carried by said shafts and adapted to receive the articles to be wrapped, means for rotating said elevator member to place the articles within said carriers, means for preventing oscillation of said shafts as the platform members are elevated, and means for folding the wrappers around the articles to be wrapped while each article is retained in its carrier.

101. In a wrapping machine the combination of means for supplying wrappers, means for supplying the articles to be wrapped, a rotatable turret provided with carriers, an elevator member provided with slotted extensions, shafts loosely mounted in the slots of said extensions, platform members having weighted portions to hold them in a normally horizontal position, platform members carried by said shafts and adapted to receive the articles to be wrapped, means for rotating said elevator member to successively elevate said platforms, means for preventing oscillation of said shafts during the upward movement of said platform members, and means for wrapping the articles elevated by said elevator member.

102. In a wrapping machine in combination of a rotatable turret provided with carriers, means for imparting a step by step rotation of said turret, folding mechanism coöperating with said carriers, an elevator member, means for rotating said elevator member, and means for locking the turret against rotation while the elevator member is moving, and means for locking the elevator member while the turret is moving.

In testimony whereof I affix my signature in presence of two witnesses.

SVEN J. C. LUTTROPP.

Witnesses:
 HOWARD E. BARLOW,
 E. I. OGDEN.